(12) United States Patent
Xu

(10) Patent No.: US 7,065,704 B1
(45) Date of Patent: Jun. 20, 2006

(54) METHODS FOR FAST HTML RENDERING

(75) Inventor: Guohong Xu, Mountain View, CA (US)

(73) Assignee: Embedded Internet Solutions, Inc., San Jose, CA (US)

( * ) Notice: Subject to any disclaimer, the term of this patent is extended or adjusted under 35 U.S.C. 154(b) by 265 days.

(21) Appl. No.: 10/198,822

(22) Filed: Jul. 18, 2002

(51) Int. Cl.
*G06F 9/00* (2006.01)

(52) U.S. Cl. ............... 715/509; 715/513; 715/517; 715/526; 715/760; 709/227

(58) Field of Classification Search ............ 345/418, 345/581–582, 744, 748–749, 760, 763–764, 345/788; 709/200–203, 217–219, 227; 707/2; 715/509, 513, 517, 526, 503, 504, 744, 748–749, 715/760, 763–764, 788
See application file for complete search history.

(56) References Cited

U.S. PATENT DOCUMENTS

| 6,311,196 B1 * | 10/2001 | Arora et al. ............... 715/513 |
| 6,356,529 B1 * | 3/2002 | Zarom ...................... 370/231 |
| 6,639,611 B1 * | 10/2003 | Leduc ....................... 345/764 |
| 2002/0156896 A1 * | 10/2002 | Lin et al. .................. 709/227 |
| 2003/0056030 A1 * | 3/2003 | Gao et al. ................. 709/330 |
| 2003/0137522 A1 * | 7/2003 | Kaasila et al. ............ 345/619 |
| 2004/0205535 A1 * | 10/2004 | Newman et al. .......... 715/509 |

\* cited by examiner

*Primary Examiner*—Matthew C. Bella
*Assistant Examiner*—Wesner Sajous
(74) *Attorney, Agent, or Firm*—Martine Penilla & Gencarella, LLP

(57) ABSTRACT

A method is provided for optimizing rendering and display of HTML data by a wireless trans-receiving device. The method includes receiving a portion of the data, and parsing the portion of the data where the parsing begins when a minimum amount of the portion of data has been received. The method also includes laying out the portion of the data for display, and displaying the portion of data in a web page form.

28 Claims, 15 Drawing Sheets

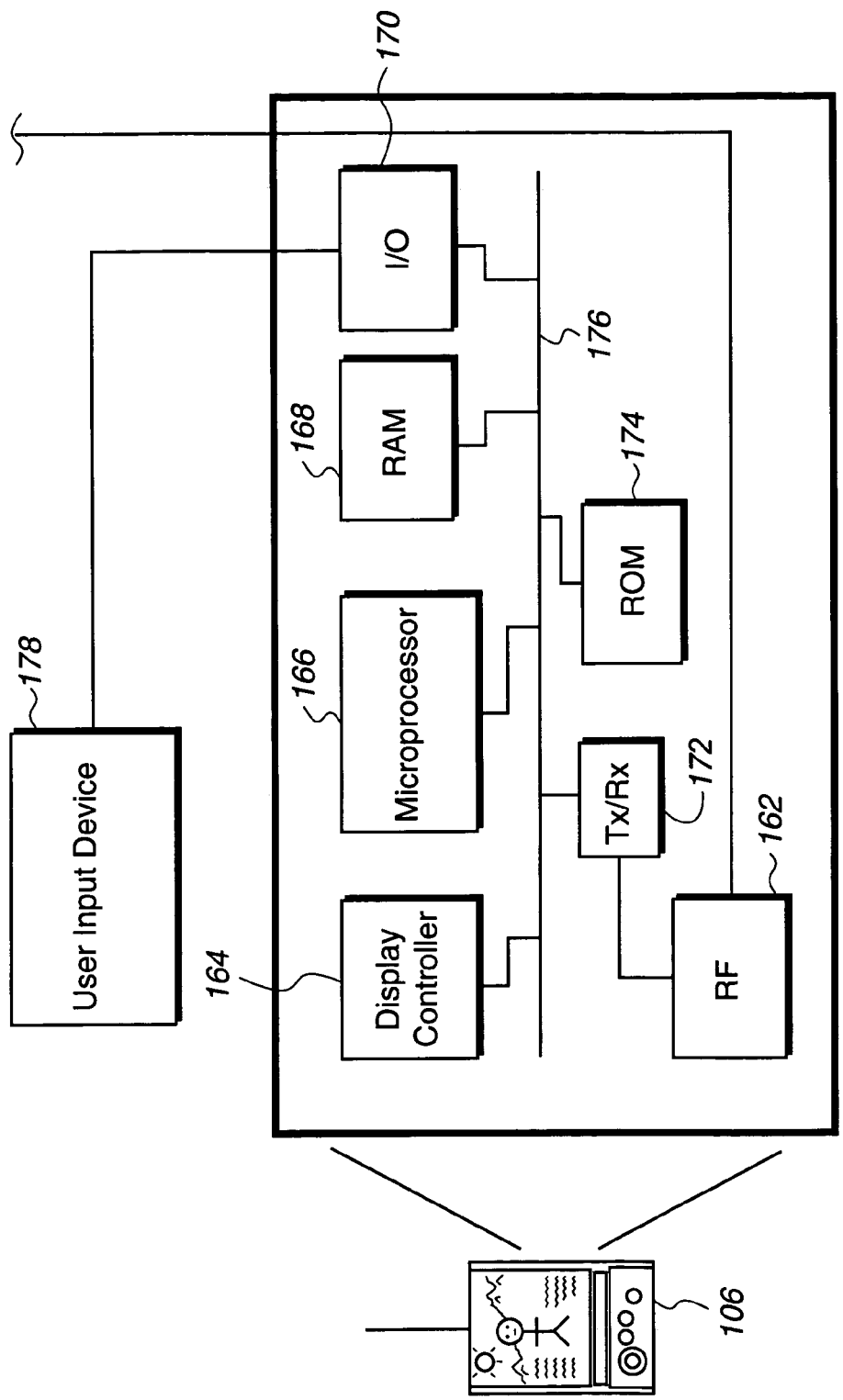

|  | Column 1 | Column 2 | Column 3 | Column 4 |
|---|---|---|---|---|
| Row 1 | 0 | 0 | 250 | 0 |
| Row 2 | 0 | 0 | 0 | 0 |
| Row 3 | 0 | 20% | 0 | 0 |
| Row 4 | 100 | 0 | 30% | 0 |

Table 500:

| | Position 0 | Position 1 | Position 2 | Position 3 | Position 4 |
|---|---|---|---|---|---|
| Left Collection | 0 | 250 | 0 | 0 | 250 |
| Right Collection | 250 | 0 | 250 | 0 | 0 |
| Sum | 250 | 250 | 250 | 0 | 250 |

Table 502:

| | Cell 1 Col 1 Row 1 | Cell 2 Col 2 Row 2 | Cell 3 Col 3 Row 3 | Cell 4 Col 4 Row 4 |
|---|---|---|---|---|
| $W^l_{[i]} = x_{[i+1]} - x_{[i]}$ | 0 | 0 | 0 | 250 |
| $W^r_{[i]} = x_{[i]} - x_{[i+1]}$ | 0 | 250 | 0 | 0 |
| Sum | 0 | 250 | 0 | 0 |

FIG. 11

METHODS FOR FAST HTML RENDERING

BACKGROUND OF THE INVENTION

1. Field of the Invention

This invention relates generally to Internet access optimization, and, more particularly, to the dynamic and speedy processing and display of Internet web pages on portable web access devices.

2. Description of the Related Art

The growth in computer information technology has spurred the creation of numerous ways to connect with the Internet. The growth in modern day communication technology has given individuals as well as companies and their employees powerful communication tools. These communication tools range from modern telephone systems that provide sophisticated cellular telephones having Internet access capabilities, wireless Internet e-mail accounts by way of portable computers, text pagers, etc. In addition, advanced devices such as personal digital assistants (PDA's) or palm top computers can use wireless communications to connect with the Internet to provide mobile utilization of the Internet. Although these technologies have provided busy business users as well as ordinary persons with affordable avenues for always having access to information and data from around the world, these technologies also necessarily introduce a level of complication.

For instance, small devices such as PDA's and wireless phones typically do not have high processor speeds to handle complex HTML table layouts as is typically utilized on many Internet web pages. When PDA's are connected to the Internet and attempt to download web pages, the HTML contents are too complex for the low speed processor of a PDA to handle so a user typically has to wait a very long time to see anything on a screen of the PDA. This long wait can be a frustrating experience for the user and oftentimes dissuades the user from connecting to the Internet when using low processing speed devices. This frustration is also seen with users of old personal computers with low speed processors. Although access to the Internet and data transfer speeds may increase, unless the data may be processed in a manner enabling a user of the Internet to have a positive experience, users may just give up and wait to access the Internet on a PC with a high speed processor.

Alternatively, because of the low processing speed of PDA's, compromises have been made regarding web browsing software for PDA's which allows faster access to web pages but does not enable full graphics as is typically seen on full-sized computer systems. For example, such systems may only show text with simplified graphics. Unfortunately, these problems are major drawbacks for most people who would like to use lightweight devices but still want rich Internet content with full versions of the web pages.

FIG. 1 shows a system 10 illustrating Internet access by portable devices through use of a wireless connection. In this example, an Internet Service Provider (ISP) 12 can provide data from the Internet to a personal computer (PC) 14, a personal digital assistant (PDA) 16, and a wireless phone 18. When the PC 14 receives complex hypertext markup language (HTML) data, because it has a powerful enough central processing unit (CPU) to properly process and display graphics associated with Internet web pages, it can typically display web pages for a user in a quick and prompt manner. In other circumstances, a user may attempt to access a Web page with the PDA 16 or the wireless phone 18 via the wireless connection with the ISP 12. Unfortunately, the PDA 16 and the wireless phone 18 typically have far less processing speed than the CPU of the PC 14. Because the PDA 16 and the phone 18 do not have enough processing speed to properly and in a timely manner display the web pages, the display process is extremely slow and at times may freeze so there is no display. Therefore, far too often, the PDA 16 and the wireless phone 18 cannot properly process data required to display Internet web pages. Such occurrences may frustrate users of such systems and relegate low processing speed environments to usage of low graphics web pages or lead to avoidance of all web surfing while within the low processing environments.

In view of the foregoing, there is a need for a method which can operate in a low processing speed environment to intelligently and powerfully process Internet data to display Internet web pages in a user friendly manner.

SUMMARY OF THE INVENTION

Broadly speaking, the present invention fills these needs by providing methods for fast rendering HTML data so low processing speed devices may efficiently and quickly display Internet web pages. It should be appreciated that the present invention can be implemented in numerous ways, including as a process, an apparatus, a system, computer readable media, or a device. Several inventive embodiments of the present invention are described below.

In one embodiment, a method is provided for optimizing rendering and display of HTML data by a wireless trans-receiving device. The method includes receiving a portion of the data, and parsing the portion of the data where the parsing begins when a minimum amount of the portion of data has been received. The method also includes laying out the portion of the data for display, and displaying the portion of data in a web page form.

In another embodiment, a method for optimizing the calculation of an HTML Table by a data processing device is provided. The method includes laying out a table having dimension attributes where the dimension attributes of the table are calculated based on column attributes for at least one column and row attributes for at least one row, and the column attributes and the row attributes are retrieved from the data.

In yet another embodiment, a method for table layout calculations for use in displaying Internet web pages on a portable data processing device is provided. The table layout calculations are accomplished after downloading and parsing of data. The method includes, for each of four types of dimension values of at least one column and for each of four types of dimension values of at least one row, accumulating values from a left collection array where accumulated values from the left collection array are stored in a left accumulation array, and accumulating values from a right collection array where accumulated values from the right collection array are stored in a right accumulation array. The method also includes calculating positions of the at least one column and the at least one row using the accumulated values from the left collection array and the accumulated right collection values from the right collection array. The method further includes determining a width of each of the at least one column and a height of each of the at least one row in a table layout.

In another embodiment, a method for optimizing rendering and display of HTML data by a wireless communications device is provided. In this embodiment, the method includes downloading a portion of data and parsing the portion of data to form a hierarchical tree with nodes containing the portion of data where the parsing begins when a minimum amount of the portion of data has been received. The method also includes collecting the portion of data from the nodes to form a plurality of collection values, and accumulating the plurality of collection values to form a plurality of accumulation values. The method further includes deriving table layout dimensions from the accumulation values, and displaying the portion of data using the table layout dimensions.

The advantages of the present invention are numerous. Most notably, by enabling fast rendering of HTML data received from the Internet, low processing speed devices such as, for example, PDAs and wireless phones may display Internet web pages without the frustrating delays typically experienced with the prior art HTML data processing systems. In addition, by having the ability to intelligently display Internet web pages with full text and graphics content, a user may have access to the entire breadth and capabilities associated with surfing the Internet. Therefore, by use of powerful HTML parsing management and fast table layout calculation methods as described herein, the present invention can greatly enhance the Internet access experience for users of low speed processing devices.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2B shows an internal layout of components within the PDA in accordance with one embodiment of the present invention.

FIG. 8 shows a table where table layout attributes are determined by a table layout algorithm in accordance with one embodiment of the present invention.

FIG. 11 shows the first table with a row of left collection values and a row of right collection values and a second table showing the values for an accumulated left to right collection and an accumulated right to left collection depicting a column span in accordance with one embodiment of the present invention.

DETAILED DESCRIPTION OF THE PREFERRED EMBODIMENTS

An invention is described for a fast hypertext markup language (HTML) rendering which enables dynamic and speedy processing and display of HTML pages on portable Internet access devices. It will be obvious, however, to one skilled in the art, that the present invention may be practiced without some or all of these specific details. In other instances, well known process operations have not been described in detail in order not to unnecessarily obscure the present invention.

In order to solve the problems of the prior art, the present invention, an Internet graphics display solution, works with portable Internet access devices to effectively manage and handle display data to effectively display Internet web pages even in low processing speed environments. In one embodiment, the method described herein serves to seamlessly interface with the Internet to receive data, parse the data, generate a table layout, and display Internet pages on a portable graphics display device such as personal digital assistants (PDAs), cellular telephones, portable computing devices, etc.

The HTML rendering engine is one of the key pieces for HTML browsing, editing and conversion. HTML content general comes as a text stream. The HTML engine as described herein recognizes tags, parses the tags, lays out the elements on a given display context, and displays the elements. Algorithms for progressive document rendering and fast table layout calculation to achieve fast display of data received over the Internet are described below.

Figure 1:
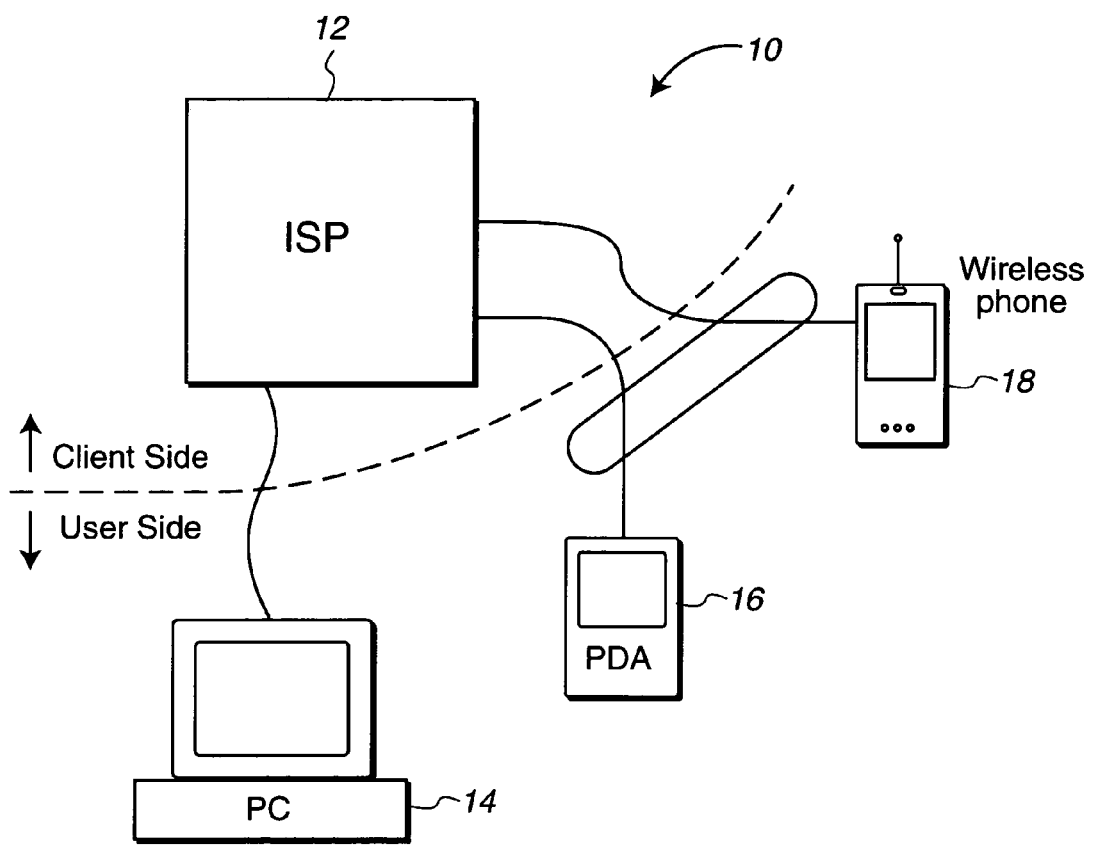
FIG. 1 shows a system illustrating Internet access by portable devices through use of a wireless connection.
Figure 2A:
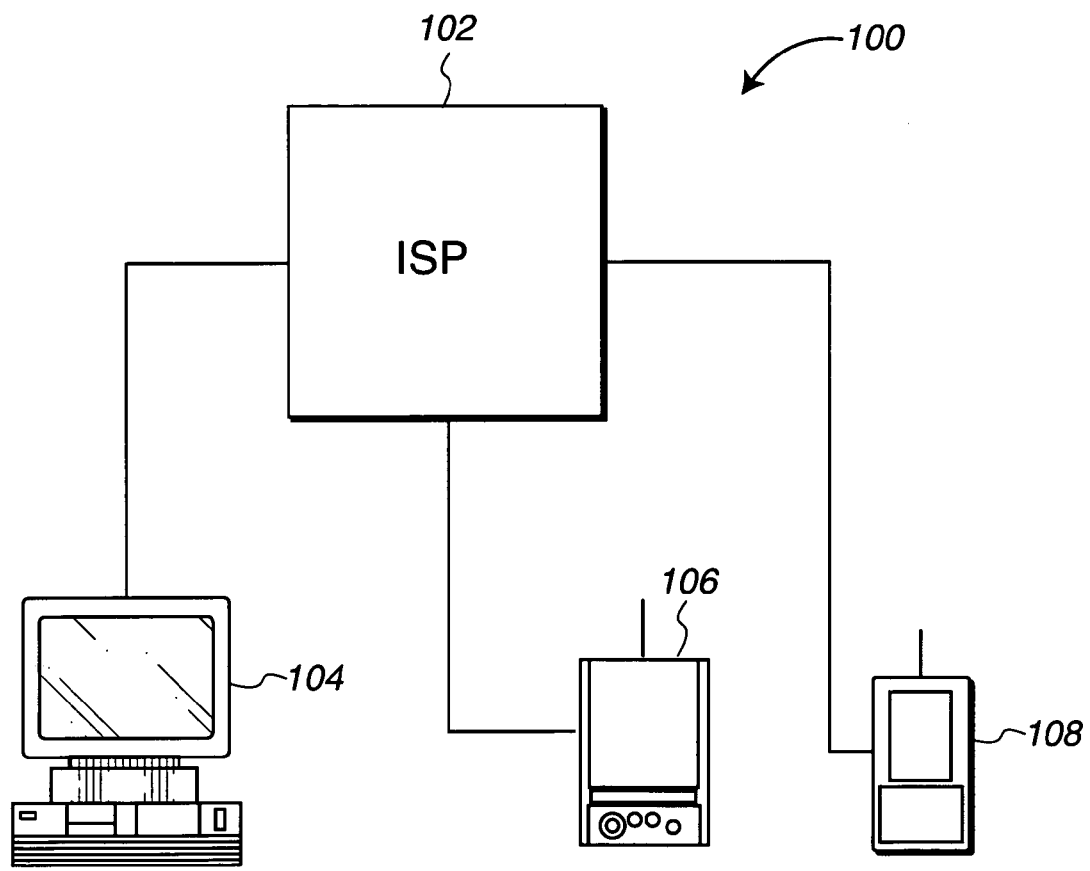
FIG. 2A shows an Internet access system in accordance with one embodiment of the present invention.

FIG. 2A shows an Internet access system 100 in accordance with one embodiment of the present invention. The system 100 includes an ISP 102 connected to a PC 104, a PDA 106, and a wireless phone 108. In this embodiment, the PDA 106 and the wireless phone 108 are low processor speed display systems that do not have as much computing power as the PC 104. It should be understood that any suitable type of device that has an Internet web browser and that may connect to the Internet can be utilized to implement the methodology described herein to optimally display Internet web pages and graphics.

In one embodiment, the PDA 106 is connected to the ISP 102 through a wireless connection. The user of the PDA 106 may desire to connect to the Internet and "surf" the World Wide Web (WWW). To do this, the user may desire to use a web browser on the PDA 106 so the user may receive and appreciate the full breadth of graphics and web page content available on the Internet. In contrast to the prior art, the methodology described herein enables the user of the PDA 106 to fully experience the graphics and the page content available to users of more powerful data processing devices such as the PC 104. This may occur through intelligent management, processing, and organization of graphics data so the PDA 106 does not "freeze" or have an overly delayed display of the web page.

FIG. 2B shows an internal layout of components within the PDA 106 in accordance with one embodiment of the present invention. The PDA 106 includes a bus 176 to which the internal data processing and communication components of the PDA 106 are connected. A display controller 164, a microprocessor 166 (e.g., central processing unit (CPU)), a random access memory (RAM) 168, an input output (I/O) 170, transmitter/receiver (Tx/Rx) 172, and a read only memory (ROM) 174 may be connected to the bus 176 in one embodiment. The Tx/Rx 172 may be connected to an RF device 162 to send and receive data through a wireless connection. It should be understood that the PDA 106 may contain any suitable type of components that would enable connection to the ISP 102, reception and transmission of data, processing of data from the ISP 102, and display of the data in a web page form. It should also be appreciated that a wireless phone or other types of wireless Internet connecting devices may have similar internal components to enable portable access to the Internet and may utilize the methods described herein to achieve an optimum Internet access experience.

In one embodiment, the display controller 164 may manage the display of text and graphics on the PDA 106. It should be understood that the display controller 164 may be any suitable type of logic that may receive and process data for displaying images on a screen of the PDA 106. The ROM 174 may contain compressed code that enables the processing of data from the ISP 102. In one embodiment, the compressed code contains the algorithm for fast rendering of HTML data. The ROM 174 may be any suitable type of memory that is capable of storing data such as, for example, EEPROM, flash memory, etc. In one embodiment, at bootup, the compressed code within the ROM 174 may be decompressed into the RAM 168 for use by the processor 166 so the data from the ISP 102 may be processed for transmission to the display controller 164 for display.

A connection for the RF device 162 is provided to an antenna so a wireless connection may be established with the Internet. The I/O 170 is connected to a user input device so data may be inputted into the PDA 106. It should be appreciated that any suitable type of data input device may be utilized for entering data into the PDA 106. In one embodiment, the user input device is a touch screen with some keys for entering data. In another embodiment, the user input device may be a keyboard. In yet another embodiment, a voice recognition system may be utilized to input data. The RF device 162 has a connection to the bus 176 so it can receive data to transmit. The RF device 162 is also connected to the Tx/Rx 172 which in one embodiment, may be a network interface card to manage the sending and receiving of data. In this way, MAC addresses can be used to send and receive data. In one embodiment, the input device may be utilized to input the uniform resource locator (URL) address to connect to selected web pages.

If the Rx is active then the PDA 106 may receive data coming from an HTML stream during normal surfing of the Web. A link may be activated resulting in a transmission of a request for data due to an input such as a click or entering of data through any number of devices such as, for example, keyboard, voice recognition hardware, etc.

Figure 3:
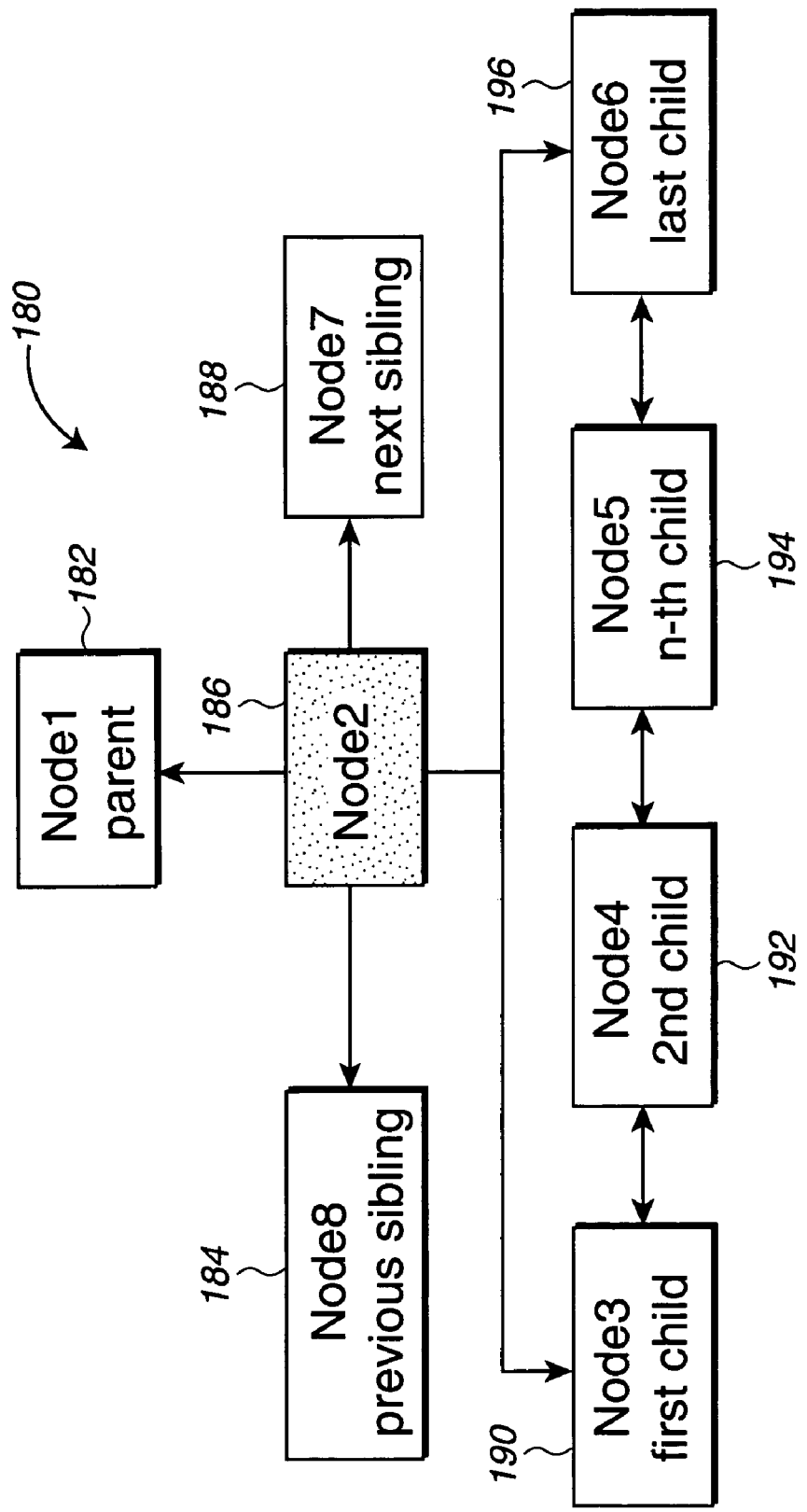
FIG. 3 shows a HTML document tree with nodes in accordance with one embodiment of the present invention.

FIG. 3 shows a HTML document tree with nodes in accordance with one embodiment of the present invention. In this embodiment, HTML contents are made up of elements. Each element is defined by an enclosure of <TAG> . . . </TAG>, or <TAG>, or just text. Any suitable type of HTML elements may be utilized with the methods described herein. After parsing the elements (as described in further detail in reference to FIG. 4), the elements are organized in the form of an HTML document tree, with each element converted into a document node. Each document node has a reference to its parent node, first child node, last child node, previous sibling node, and next sibling node.

The hierarchical document tree is illustrated by diagram 180. In this embodiment, an exemplary HTML document tree that is produced from parsing of a stream of HTML data is shown. It should be appreciated that the HTML data may be received by display device in any suitable fashion such as, for example, by a wireless connection. In the HTML document tree, node-1 182 is a parent node of node-2 186. Node-2 186 may have any number of sibling nodes such as node-8 184 and node-7 188 depending on the data structure. Node-2 186 may have any suitable number of child nodes such as, for example, node-3 190, node-4 192, node-5 194, node-6 196, etc. For example, the node-2 186 may be a table element. Therefore, the children nodes of node-2 186 may include children elements that assist in defining the structure and contents of the node-2 186. In this way, data may be organized in coherent manner so text and graphics of an HTML based web page may be displayed properly on a display panel.

Figure 4A:
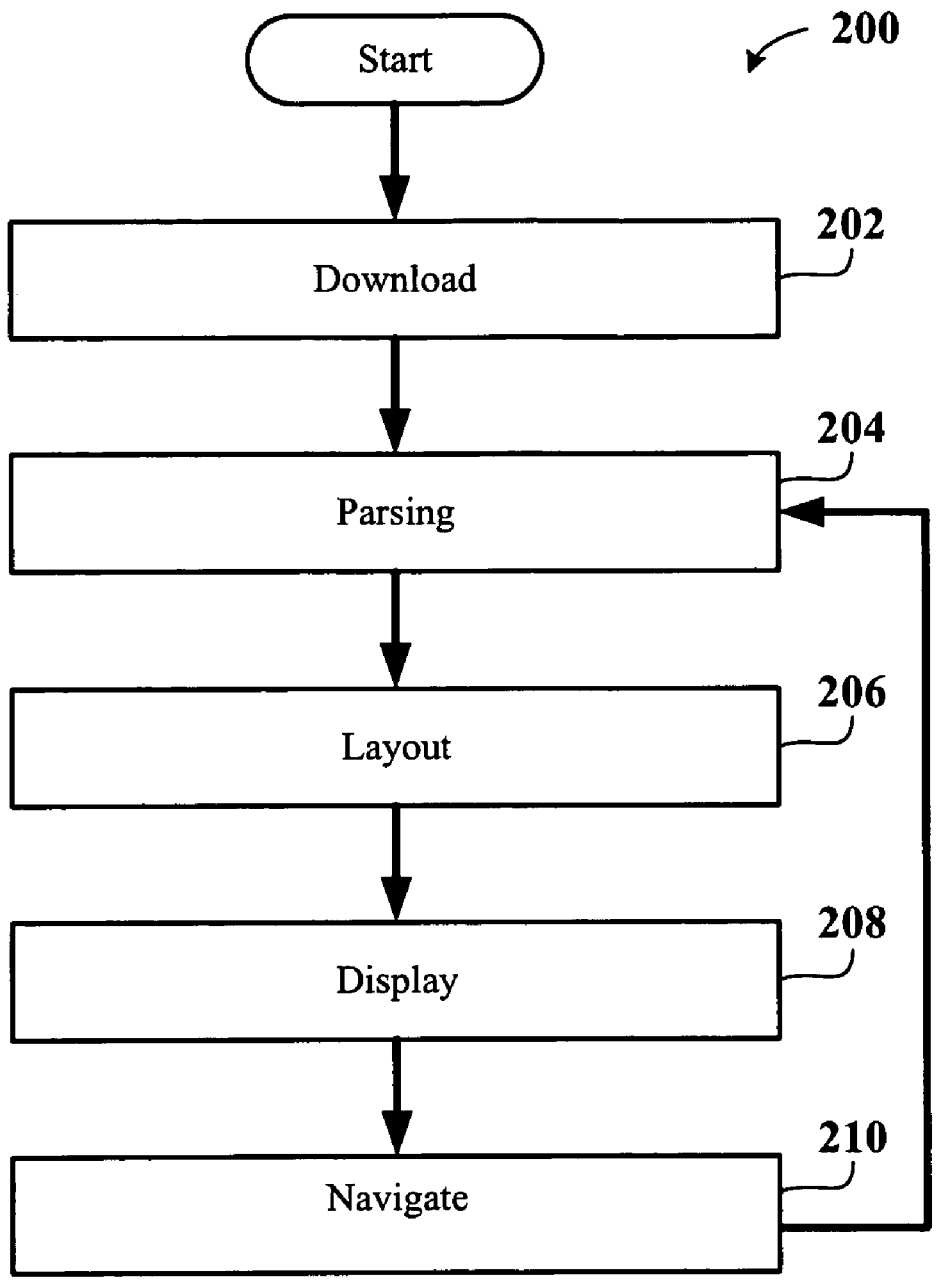
FIG. 4A illustrates a flowchart which depicts the progressive rendering in accordance with the present invention.

FIG. 4A illustrates a flowchart 200 which depicts the progressive rendering in accordance with the present invention. It should be understood that the processes depicted in the flowchart 200 may be in a program instruction form written on any type of computer readable media. For instance, the program instructions can be in the form of software code developed using any suitable type of programming language. It should also be appreciated that the methods described herein may be embodied in hardware form. Fast rendering may be utilized to optimize Internet access when conditions such as slow network connections, limited CPU processing speed, and limited system memory resources exist. During such conditions, progressive rendering of HTML data stream can be utilized to ensure good user experience by enabling fast display of Internet web pages.

In this embodiment, the method begins with operation 202 which conducts a download. Operation 202 may, in one embodiment, download HTML data stream from an ISP.

After operation 202, the method moves to operation 204 which parses. In one embodiment, the operation 204 may parse the data downloaded in operation 202 and generate an HTML document tree. In this embodiment, only certain amounts of data (or portions of data) are downloaded and parsed. Therefore, the low speed processor that is processing the downloaded data can take manageable data amounts instead of trying to process all of the data at once which may stall the layout function of operation 206. Operation 204 stops parsing after a certain amount of data is processed. Therefore, at this time a partial HTML document tree might be generated. The method saves the place where the processing was stopped and the HTML document tree built up to that time so when operation 204 is run again (as will be seen later), the method knows where to start up the processing.

After operation 204, the method advances to operation 206 which conducts a layout. In operation 206, the method conducts layout of the web page using the portion of data that has been parsed. In one embodiment, when the method encounters a request to display a table, a table generation algorithm is run as discussed in further detail in reference to FIGS. 7A through 7C. The method therefore, calculates and generates a table layout with proper dimensions. After operation 206, the method moves to operation 208 which displays what was laid out in operation 204. In one embodiment, operation 208 may display the portion of the data in a web page form on a screen of a portable low processor speed device. It should be appreciated that any suitable type of image may be shown such as, for example, text, graphics, tables, etc.

After operation 208, the method moves to operation 210 which navigates. In one embodiment, operation 208 may receive instructions to navigate the Internet. If no navigation is desired, the method moves back to operation 204 and repeats operations 204, 206, 208, and 210 so further data for a desired Internet web page can continue to be processed and displayed. If the method moves back to operation 204, that operation starts off where it left off in a previous parsing process. Therefore, the method starts parsing the HTML data stream in the location where the parsing ended previously, and then retrieves the previously built HTML document tree and adds new nodes to it as specified in the HTML data stream. Thus, an unprocessed portion of the data is then received, parsed, laid out, and displayed. In this way, in one embodiment, a portion of an HTML based web page may be displayed to a user while another portion of the same HTML based web page may be processed. If navigation data is received such as, input of a new web page address, the method terminates and starts over again by downloading data regarding the new web page.

Figure 4B:
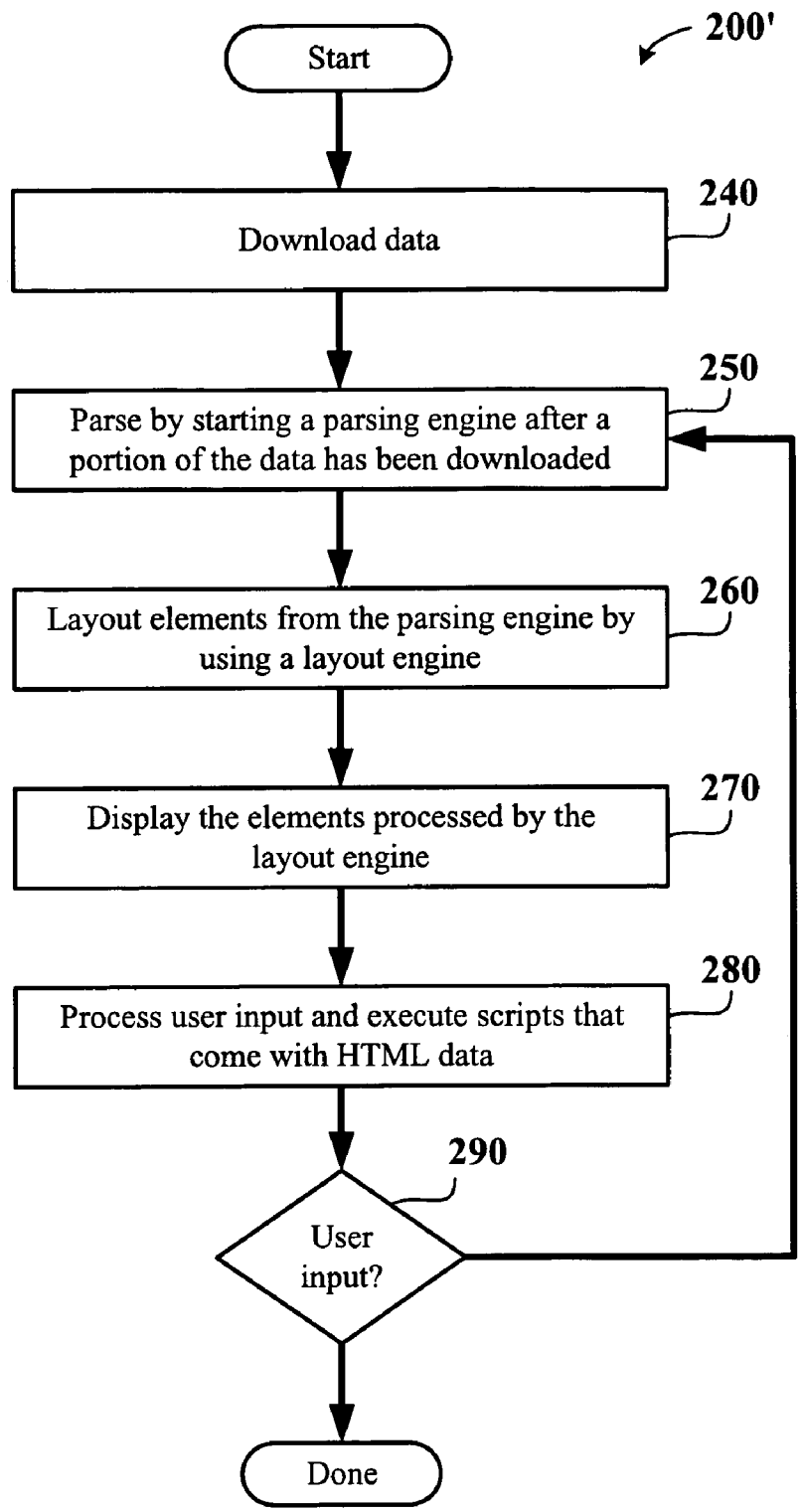
FIG. 4B shows a flowchart illustrating the method of displaying a web page by progressively rendering of HTML data received by a low processor speed device in accordance with one embodiment of the present invention.

FIG. 4B shows a flowchart 200' illustrating the method of displaying a web page by progressively rendering of HTML data received by a low processor speed device in accordance with one embodiment of the present invention.

The method begins with operation 240 which downloads data. It should be appreciated that operation 240 may receive data through any type of way such as for example, a wireless connection, a hardwire connection, an optical connection, etc. In one embodiment of this operation, the PDA may receive data from the ISP through a wireless connection received through a radio frequency signal received by the PDA. In one embodiment, the data received is a stream of HTML data for displaying an Internet web page. The data may be stored within the RAM of the PDA so the processor of the PDA can process the data at a given time.

After operation 240, the method proceeds to operation 250 where the data is parsed by starting a parsing engine after a portion of the data has been downloaded. In one embodiment, an HTML data stream is received and the data stream is parsed to produce an HTML document tree. Operation 250 is conducted by a parsing engine that starts parsing after a certain amount of data has been received. It should be appreciated that the term engine is used to describe running of an algorithm that is utilized to process data. The algorithm may be in any suitable form such as code sitting in, for example, the ROM or RAM.

The parsing engine stops after certain amount of time has passed and a minimum number of new elements have been created. It should be appreciated that the certain amount of time and the minimum number of new elements may be any suitable amount or number and can be set to user desires. In one embodiment, the parsing engine is started after 1 kilobyte of data is received. After the 1 kilobyte of data is processed, if there are more data in the stream, the engine will save its current state, otherwise, the engine will be terminated if all data has been received. In this way partial parsing and processing of data may be done so the data that has been downloaded is parsed. Consequently, a portion of an Internet web page may be shown in a quick and timely manner. In one embodiment, the parsing engine may stop after between 0.01 seconds and 5 seconds. In a preferable embodiment, the parsing engine may stop after about 0.5 seconds. Operation 250 is described in further detail in reference to FIG. 5.

Then operation 260 conducts a layout of elements from the parsing engine by using a layout engine. The layout engine starts to work when the parsing engine has created some new elements and a certain amount of time has passed since the last layout. The layout engine is stopped when a specified period of time has passed and/or a minimum of some number of elements has been processed by the layout engine. It should be appreciated that the layout engine may be stopped after any suitable amount of time has passed and/or any suitable minimum number of elements has been processed. Therefore, operation 260 lays out the portion of data that has been downloaded.

The layout engine starts to process the nodes of the HTML document tree as produced by the progressive parsing process as shown in FIG. 3. As the web page is being laid out, data indicating generation of a table may be received when data is extracted from a particular node. In that case, the method starts a fast table layout calculation algorithm as described by flowchart 260 in further detail in reference to FIGS. 6 and 7A through 7C. For those elements in an HTML document tree such as, for example, <TABLE> <TD> <DIV> that contain child elements, once the layout calculation is done in the previous pass, if the children elements are not changed, the layout engine will not recalculate layout of itself and its child elements. Therefore repetition of the same calculations is avoided for the cells in a table that have been processed. <TABLE> is an HTML element that creates a table. The element <TD> sets off each row in a table, and <DIV> defines a content to be block-level. Child elements are data defined by the elements. By using algorithms for fast table layout calculation which is based on calculations done by using values for columns and rows instead of by cells, the calculation time for table layout may be reduced significantly as compared with the prior art. The values for the dimension attributes such as, for example, column widths and row heights, are derived concurrently by using the methods of operation 260 as described in further detail in reference to FIGS. 7A through 7C. It should be understood that the dimension attributes utilized herein may be any suitable type of dimension. By determining the column widths and the row heights, table layout may be ascertained without complicated cell by cell calculations.

After operation 260, the method moves to operation 270 where elements processed by the layout engine are displayed. In one embodiment of this operation, the method displays the elements on a display surface of the Internet access device being utilized. In one embodiment, the display surface is an LCD screen of a PDA or a wireless phone. It should be understood that any suitable type of display surface may be utilized with the methods described herein. The displaying of the elements is conducted by a display engine. The display engine has the intelligence to understand that there are certain numbers of elements to be displayed from the layout engine. These elements will be displayed if they are visible on the screen. Elements such as images that will take a long time to display will be stored in a queue and displayed on the next entrance of the display engine. Therefore, at least a portion of the web page may be displayed in a very quick manner. In this way, users are not frustrated because they are seeing some progress in the display of the web page.

Then operation 280 processes user input and executes scripts that comes with HTML data. In this operation, a navigation engine may receive user input through the input interface so a user may navigate through the Internet.

After operation 280, the method moves to operation 290 which determines if there is any user input. If user input exists such as, for example, entering another URL to access a different web page, the method ends and the process is started all over again. This occurs because if another URL is selected, new data from the new Internet web page will have to be parsed, laid out, and displayed. In this way, even if the old web page has not fully loaded, the old display data may be discarded and a new web page can start to be displayed. If another URL is entered, a new HTML rendering engine is started and the previous HTML rendering engine with the parsing engine, the layout engine, the display engine, and the navigation engine are discarded. If there is no user input, the method moves back to operation 250 and repeats operations 250, 260, 270, and 280. This occurs because the method processes more of the data received from the Internet so more of the web page is displayed for the user. In one embodiment, a parsing state, a layout state, and a display state at a point of stoppage is saved so when the operations 250, 260, 270, and 280 are repeated, the web page may be continued to be displayed without restarting the whole process from the very beginning of the data stream.

Figure 5:
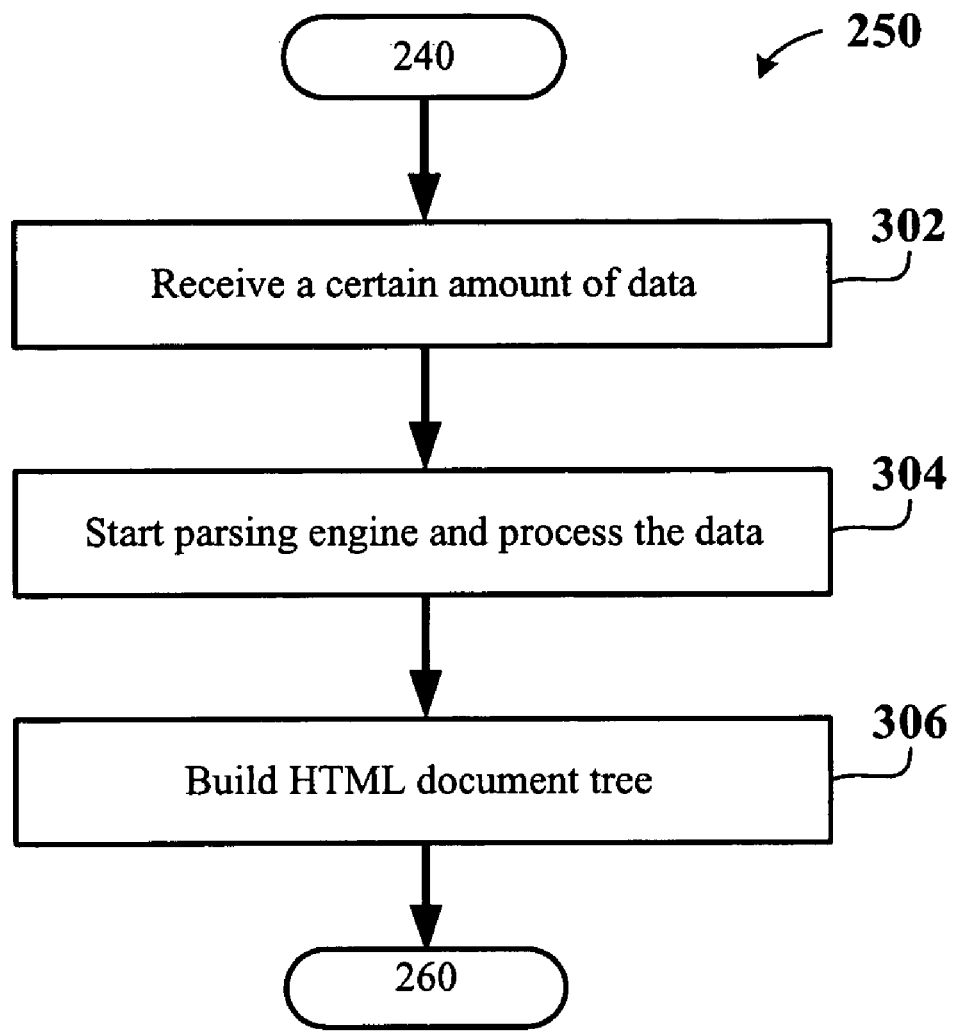
FIG. 5 defines a flowchart which shows the operation of downloading data in accordance with one embodiment of the present invention.

FIG. 5 defines a flowchart 250 which shows the operation of downloading data in accordance with one embodiment of the present invention. In this embodiment, the flowchart 240 begins with operation 302 which receives a certain amount of data. In one embodiment, the data received may be stored in the RAM of the device being utilized to view the Internet web page. In a particular embodiment, the data may be in the form of HTML stream data received by a portable data processing device from an ISP.

After operation 302, the method moves to operation 304 which starts the parsing engine and processes the certain amount of data. In operation 304, the parsing engine is started after the certain amount of data has been downloaded. The method waits to receive a certain user defined amount of data before any processing is started. It should be appreciated that any suitable amount of data may trigger the beginning of data processing. In one embodiment, the method waits for 1 kilobyte (k) of data before processing the data. In another embodiment, the method may wait for 2k of data. Depending on the performance characteristics desired by the user, the method can be set to wait for any suitable amount of data.

After operation 304, the method moves to operation 306 where an HTML document tree is built. The HTML document tree includes a hierarchical node system which has a particular node for a particular element. A partial HTML document tree such as, for example, the type shown in FIG. 3 may be generated for the HTML data that has been received. If additional downloads are received at a later time, the HTML document tree may be revised to incorporate the newly downloaded HTML stream data. The notation of the document tree as shown in FIG. 3 illustrates how the data are stored and manipulated in the rendering algorithms described herein.

Figure 6:
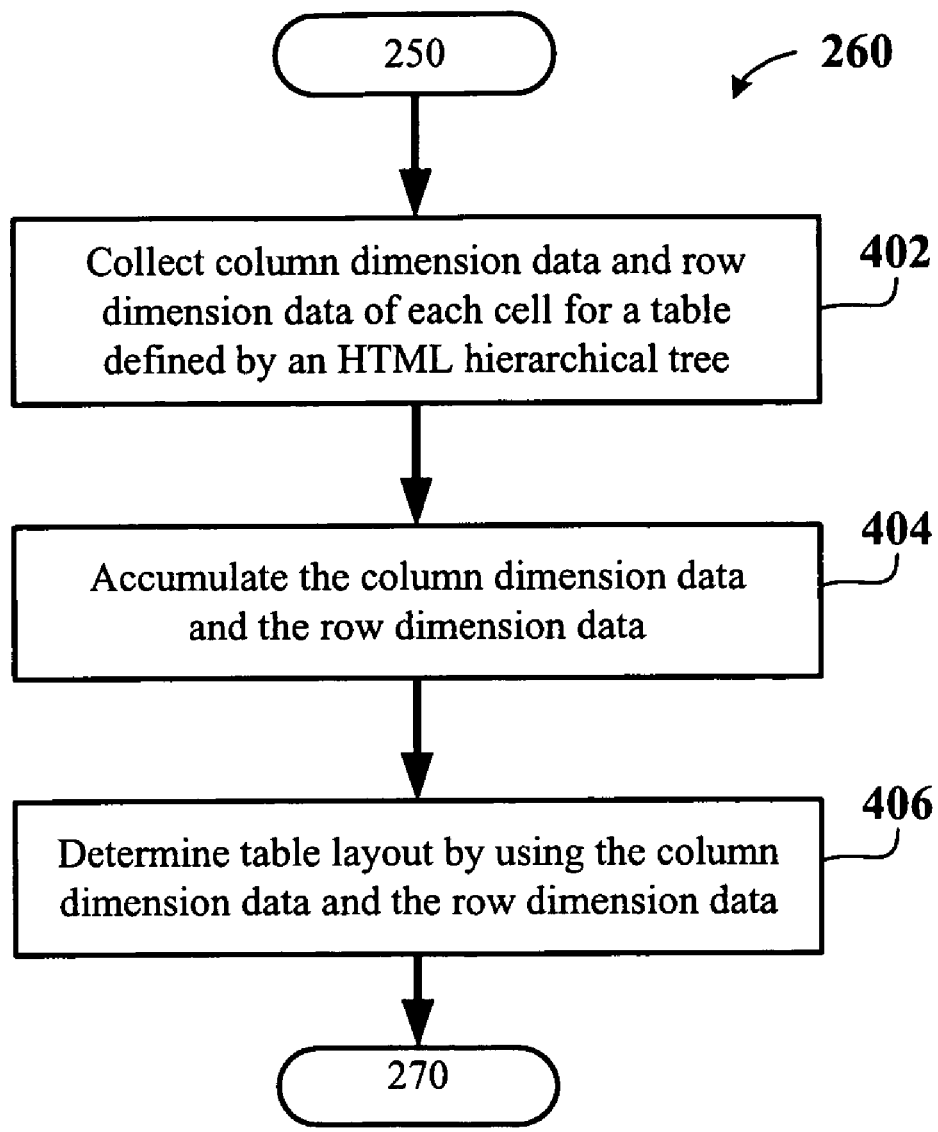
FIG. 6 illustrates a flowchart which defines the operation of fast table layout calculation when a table is to be displayed in accordance with one embodiment of the present invention.

FIG. 6 illustrates a flowchart 260 which defines the operation of fast table layout calculation when a table is to be displayed in accordance with one embodiment of the present invention. The algorithm described in reference to FIGS. 6 and 7A through 7C are utilized when the layout engine processes a node which indicates display of a table. In HTML layout, engine table layout calculation is typically the most complicated and time consuming. Each table is made up many cells, namely M-columns and N-rows. The World Wide Web Consortium (W3C) specifies the guidelines on typical HTML table layout calculation. Generally, attributes of each of the cells in the table layout are calculated separately by cells. Therefore, in large table layouts where the values for M and N are large, the amount of calculations for M times N cells can be staggering. Thus, a straight implementation of the W3C guideline unfortunately results in a very memory consuming and time consuming process. Consequently, the W3C guideline is only viable for simple web pages on fast processors. The fast table layout calculation algorithm as described herein only utilizes a limited amount of memory and can run well on low speed CPUs. Therefore, the fast table layout algorithm enables satisfying web page display on low processing speed web browsing devices such as, for example, PDAs and wireless phones.

In one embodiment, flowchart 260 describes the fast table layout calculation for column widths and row heights. In a preferable embodiment, the fast table layout calculation for the column widths and the row heights may be conducted at the same time. It should be appreciated that the methods of determining column widths and row heights may be conducted concurrently, or one after another depending on the setting utilized. As shown below, by analyzing the dimension attributes of columns and the rows, the table layout calculations may be performed without the at least M times N calculations as is required by the prior art method.

The flowchart 260 begins with operation 402 which collects column dimension data and row dimension data for each cell for a table defined by an HTML document tree. In operation 402, the method goes through each of the children nodes of the table node and moves cell by cell and collects dimension data for each of the cells and encodes data by using left collection and right collection arrays. Operation 402 is described in further detail in reference to FIG. 7A.

After operation 402, the method moves to operation 404 which accumulates the column dimension data and the row dimension data. In this operation, the method accumulates the column dimension data and row dimension data that was encoded and collected from the cells during operation 402. Operation 404 is discussed in further detail in reference to FIG. 7B.

Then operation 406 determines table layout by using the column dimension data and the row dimension data. In this operation, the method examines all of the column dimension data and the row dimension data for each column and for each row and through this data generates a table layout. Operation 406 is described in further detail in reference to FIG. 7C.

Figure 7A:
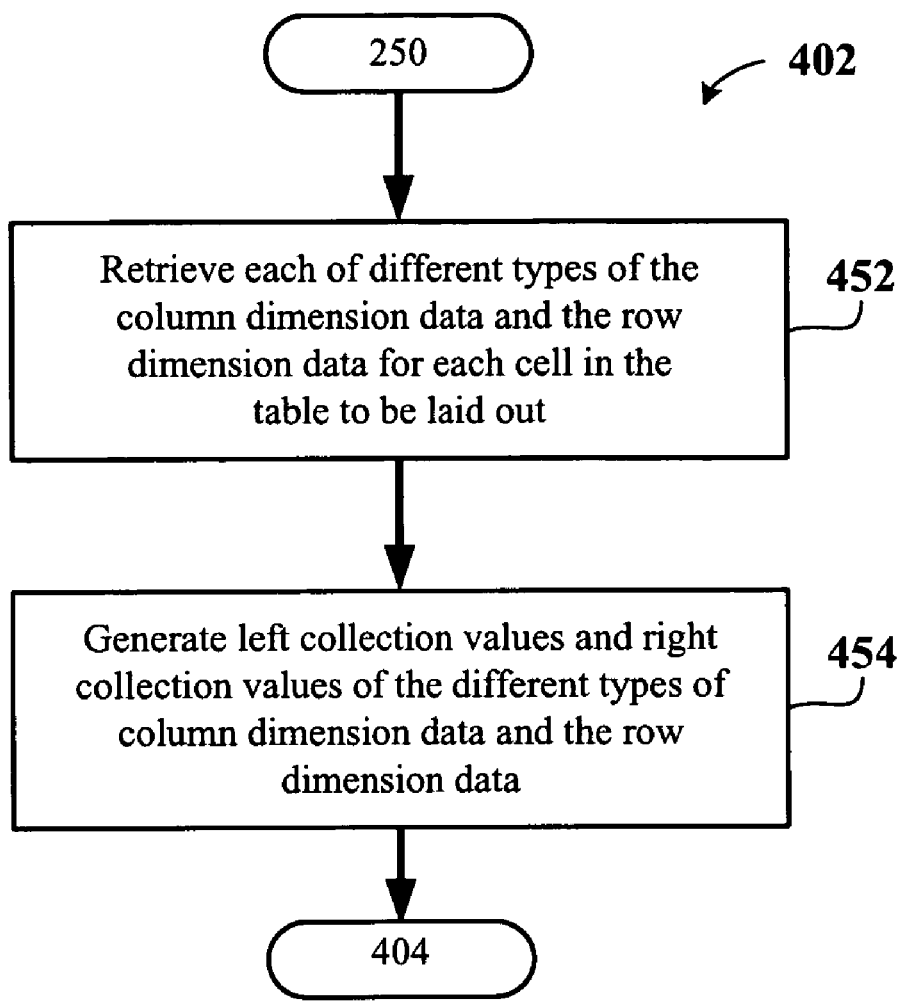
FIG. 7A shows a flowchart defining the collecting of column dimension data and row dimension data in accordance with one embodiment of the present invention.

FIG. 7A shows a flowchart 402 defining the collecting of column dimension data and row dimension data in accordance with one embodiment of the present invention. In flowchart 402, the method begins with operation 452 which retrieves each of different types of the column dimension data and different types of row dimension data of each cell in the table to be laid out. In this embodiment, operation 452 collects dimension data, cell by cell, from the children nodes of the table node within the HTML document tree. In one embodiment, data for each of the cells in the table to be displayed includes data regarding the dimensions of the cell. In one such embodiment, the children node may include column width and row height data for each cell. In addition, for each of the column width and each of the row height, there are any suitable numbers of different types of values that can represent the column width and row height. In one embodiment, different data types to establish column width may include a minimum width of each column, a maximum width of each column, a percentage width specification of each column, and a pixel width specification of each column. Different data types to establish row height may include, in one embodiment, a minimum height of each row, a maximum height of each row, a percentage height specification of each row, and a pixel height specification of each row.

After operation 452, the method moves to operation 454 which generates left collection values and right collection values of the different types of column dimension data and the row dimension data. A plurality of left collection values may be known as a left collection array, and a plurality of right collection values may be known as a right collection array. In one embodiment of this operation, as values for the different types of column dimension data and row dimension data are retrieved, those values are segregated into arrays of data organized by the types of column dimension data and the types of row dimension data. In one exemplary embodiment, for a particular type of dimension data (e.g., minimum width of each column, maximum width of each column, percentage width specification of each column, pixel width specification of each column, etc.) for the cells in row 1, columns 1 through M (where M is the number of columns in the table), the values from each cell may be organized in a left collection array and a right collection array as discussed in reference to FIGS. 7A through 7C and 9 through 11. Each of the left collection array and the right collection array contain M+1 values where M is the number of columns. If the data is for row dimensions, the left collection array and the right collection array contain N+1 values where N is the number of rows.

In one embodiment, the left collection array for a particular column or row dimension data and the right collection array for a particular column or row dimension data may be generated at approximately the same time. For example, when a first cell (column 1, row 1) dimension data is received for a particular column dimension data (e.g., minimum width of each column, maximum width of each column, percentage width specification of each column, pixel width specification of each column, etc.), a left collection array and right collection array is generated for the particular type of column dimension data. As data for other cells are retrieved, the left collection and right collection arrays for a particular dimension data may grow larger with the added data. The following example describes the generation of values within a left collection array and a right collection array when the cell data for one particular type of column dimension value is retrieved. It should be appreciated that the same types of calculations and generation of left collection and right collection arrays may be utilized with other types of column and row dimension data such as, for example, maximum width of each column, percentage width specification of each column, pixel width specification of each column, minimum height of each row, maximum height of each row, percentage height specification of each row, pixel height specification of each row, etc.

If, for example, the minimum width of the column as indicated by the data for a first cell (e.g., first cell of the table) is 0, the left collection array would indicate 0 in a first position and 0 in a second position. The right collection array would indicate 0 in a first position and 0 in the second position. Therefore, in this example, because the minimum width of the column as indicated by the data for the first cell is 0, the first two values (moving from left to right) of the left collection array have to be values where a value of the second position subtracted from the value of the first position have to be 0.

The right collection array would indicate 0 in a first position and 0 in the second position. Therefore, in this example, because the minimum width of the column as indicated by the data for the first cell is 0, the values of the first position and the second position (moving right to left) of the array of the right collection array would have values where a value of the second position subtracted from the value of the first position have to be 0.

Continuing this example, if the second cell (column 2, row 1) has a minimum width value of 0 then a value for a third position is added to the left collection array and the right collection array. Therefore, the second position value and a third position value (the value that needs to be added due to the second cell data being retrieved) moving left to right, equals the value of the minimum width value of the second cell (which in this case is 0). So the value for the third position in the left collection array would be 0 (because the value of the third position minus the value of the second position would then be 0—0).

For the right collection, the second position value and a third position value (the value that needs to be added due to the second cell data being retrieved) moving right to left, have to equal the value of the minimum width value of the second cell (which in this case is 0). So the value for the third position in the left collection array would be 0 (because the value of the second position minus the value of the third position would then be 0—0).

When data from the third cell (column 3, row 1) is received and the minimum has a minimum width value of 250 then a value for a fourth position is added to the left collection array and the right collection array. Therefore, the third position value subtracted from a fourth position value (the value that needs to be added due to the third cell data being retrieved) moving left to right, have to equal the value of the minimum width value of the third cell (which in this case is 250). So the value for the fourth position in the left collection array would be 250 (because the value of the fourth position minus the value of the third position would then be 250-0).

Figure 9:
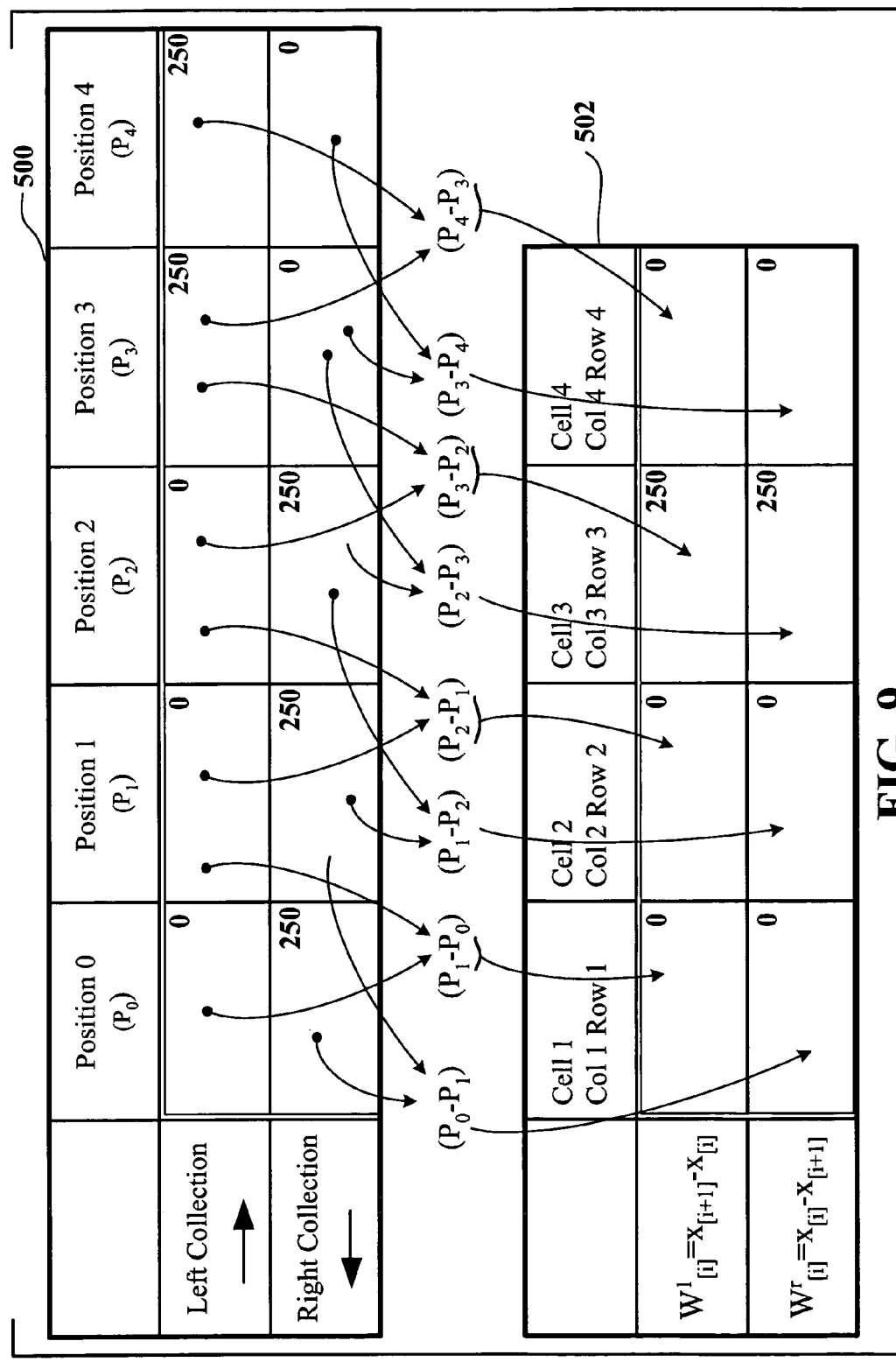
FIG. 9 shows a first table with five position values for each of a left collection array and a right collection array and a second table showing the values for an accumulated left to right collection array and an accumulated right to left collection array in accordance with one embodiment of the present invention.
Figure 10:
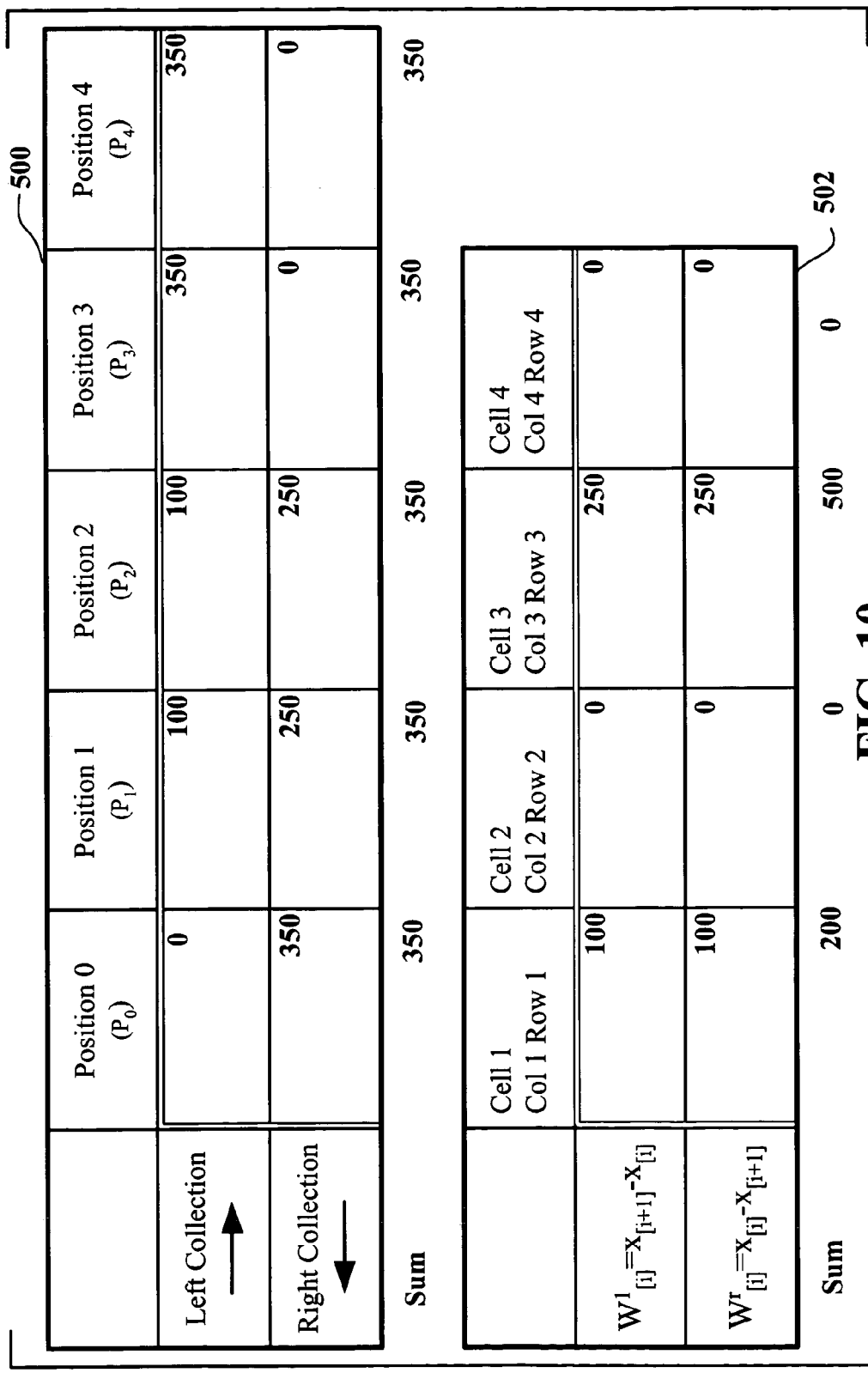
FIG. 10 illustrates a first table and a second table of FIG. 9 when a value of a dimension data of a first cell is changed in accordance with one embodiment of the present invention.

For the right collection, the third position value and a fourth position value (the value that needs to be added due to the third cell data being retrieved) moving right to left, have to equal the value of the minimum width value of the third cell (which in this case is 250). So the value for the fourth position (moving right to left) in the left collection array would be 250 (because the value of the second position minus the value of the third position would then be 250-0). This type of calculation and input of values into the left collection array and the right collection array continues until, in one embodiment, data for all column width types for all columns and data for all row height types for all rows have been recorded from the cell data within the HTML document tree. As will be seen below in reference to FIG. 11, the usage of a left collection array and a right collection array for a particular type of dimension data enables column spans to be encoded. FIGS. 9 through 11 depict some exemplary left collection arrays and right collection arrays shown in tabular format. For the accumulation calculations of FIG. 7B, the accumulation occurs through differentiating the different positions of the left collection array and the right collection array to retrieve the column width data and row height data derived from the individual cells.

Figure 7B:
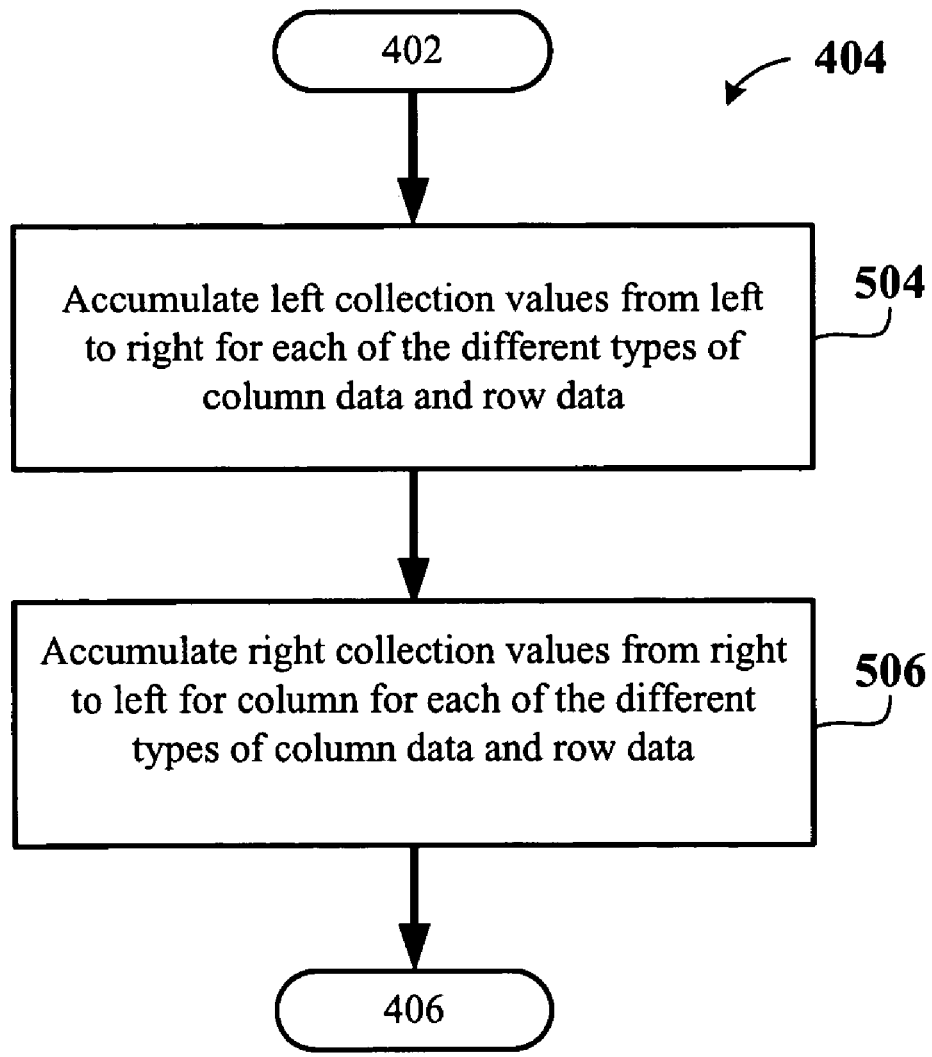
FIG. 7B illustrates a flowchart which defines the accumulating the column dimension data and the row dimension data in accordance with one embodiment of the present invention.

FIG. 7B illustrates a flowchart 404 which defines the accumulating the column dimension data and the row dimension data in accordance with one embodiment of the present invention. The flowchart 404 begins with operation 504 which accumulates values in the left collection array from left to right for each of the different types of column dimension data and for each of the different types of row dimension data.

The left to right and right to left accumulations (also known as left and right accumulations respectively) are achieved through differentiating values in the left collection arrays and differentiating values in the right collection arrays respectively. In one embodiment, operation 504 accumulates the values for each of the XCOLMIN, XCOLMAX, XCOLPIX, and XCOLPCT data for each column from the corresponding left collection array (each of the different types dimension data its own left collection array and right collection array). The XCOLMIN is an accumulative minimum width of each column. The XCOLMAX is an accumulative maximum width of each column. The XCOLPCT is an accumulative percentage width specification of each column. The XCOLPIX is an accumulative pixel width specification of each column. The left accumulation utilizes values within the respective left collection arrays for each of the column width minimum, column width maximum, column width pixels, and column width percentage to determine the accumulated values for XCOLMIN, XCOLMAX, XCOLPIX, and XCOLPCT respectively for each different column. Therefore, in one exemplary embodiment, when the left accumulation of XCOLMIN is to be conducted, the values within the left collection array for the column minimum width values are differentiated. Thus, XCOLMIN, XCOLMAX, XCOLPCT and XCOLPIX are calculated from information of the values of each cell but individual calculations for each cell are not necessary because the table layout calculations may be enabled through use of column dimension data and row dimension data.

In addition, in one embodiment, the data for YROWMIN, YROWMAX, YROWPIX, and YROWPCT are accumulated from their respective left collection arrays at substantially the same time as the column data. The YROWMIN is an accumulative minimum height of each row. The YROWMAX is an accumulative maximum height of each row. The YROWPCT is an accumulative percentage height specification of each row. The YROWPIX is an accumulative pixel height specification of each row.

For row calculations, the left accumulation utilizes values within the left collection arrays for each of the row height minimum, row height maximum, row height pixels, and row height percentage to determine the accumulated values for YROWMIN, YROWMAX, YROWPIX, and YROWPCT respectively for each row. Therefore, in one exemplary embodiment, when the left accumulation of YROWMIN is to be conducted, the values within the left collection array for the minimum row height values are differentiated. Thus, YROWMIN, YROWMAX, YROWPIX, and YROWPCT are calculated from information of the values of each cell. The left accumulation process is further described in reference to FIGS. 9 through 11.

After operation 504, the method moves to operation 506 which accumulates right collection values from right to left for each of the different column dimension values and for each of the row dimension values. In one embodiment, the operation 506 accumulates data from a right collection array for the particular dimension data type that is being determined.

The right accumulation utilizes values within the right collection arrays for each of the column width minimum, column width maximum, column width pixels, and column width percentage to determine the accumulated values for XCOLMIN, XCOLMAX, XCOLPIX, and XCOLPCT respectively for each column. Therefore, in one exemplary embodiment, when the right accumulation of XCOLMIN is to be conducted, the values within the left collection array for the column minimum width values are differentiated. Thus, XCOLMIN, XCOLMAX, XCOLPCT and XCOLPIX are calculated from information of the values of each cell. The right accumulation process is further described in reference to FIGS. 9 through 11.

In addition, arrays of data for YROWMIN, YROWMAX, YROWPIX, and YROWPCT are accumulated from the right collection data. The YROWMIN is an accumulative minimum height of each row. For row calculations, the right accumulation utilizes values within the right collection arrays for each of the row height minimum, row height maximum, row height pixels, and row height percentage to determine the accumulated values for YROWMIN, YROWMAX, YROWPIX, and YROWPCT respectively for each row. Therefore, in one exemplary embodiment, when the right accumulation of YROWMIN is to be conducted, the values within the right collection array for the minimum row height values are differentiated. Thus, YROWMIN, YROWMAX, YROWPIX, and YROWPCT are calculated from information of the values of each cell. The right accumulation process is further described in reference to FIGS. 9 through 11.

Thus each array of accumulative quantities contains two sets of data (left accumulation and right accumulation). Although the accumulation is described as being left to right and right to left, the accumulation may also take place from top to bottom and bottom to top respectively depending on the configuration of the data being utilized. In other embodiments, tables do not have to be used at all as long as the values utilized are organized in a coherent manner. In one embodiment, the column calculations may utilize the left to right accumulations and right to left accumulations (where the columns change but rows are kept constant) while the row calculations may utilize the left to right accumulations and right to left accumulations (where the rows change but the columns are kept constant). This embodiment can be seen with respect to FIGS. 9 through 11

Figure 7C:
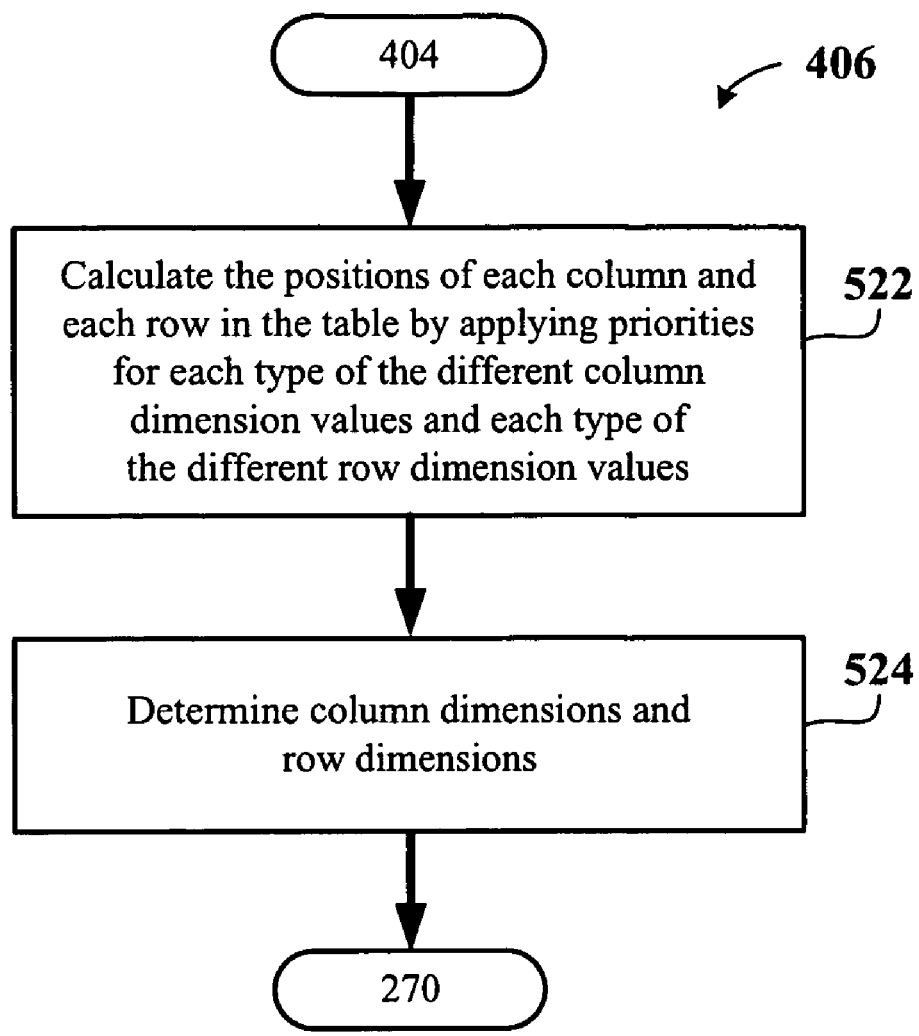
FIG. 7C shows a flowchart which defines the determining table layout by using the column dimension data and row dimension data in accordance with one embodiment of the present invention.

FIG. 7C shows a flowchart 406 which defines the determining table layout by using the column dimension data and row dimension data in accordance with one embodiment of the present invention. The flowchart 406 starts with operation 522 which calculates the positions of each column and each row in the table by applying priorities for each type of the different column dimension and each type of the different row dimension values. In this embodiment, the two sets of accumulative values (left accumulative and right accumulative as described below in reference to FIGS. 7A to 7C and 9 through 11) for each of XCOLMIN, XCOLMAX, XCOLPIX, and XCOLPCT are utilized to derive XCOLPOS. By knowing the column widths of each of the columns, the XCOLPOS is calculated for each column within the table layout.

The XCOLPOS is calculated based on available width information, XCOLMIN, XCOLMAX, XCOLPCT, XCOLPIX for each column in the table. Therefore, for each column, all of the above types of column dimension data are taken into account so depending on the priorities given to the types of column dimension data, certain values of column width will trump another value for column width in a particular row. During calculation of XCOLPOS, XCOLMIN has the highest priority, then XCOLPCT has the secondary priority, the XCOLPIX has the third highest priority, and the XCOLMAX has the lowest priority. For, example, if one cell in a column has a XCOLMAX value and another cell in the row has a XCOLMIN value, the XCOLMIN value is utilized to for table layout.

For row dimension calculations, in one embodiment, the two sets of accumulative values (left accumulative and right accumulative as described below in reference to FIGS. 9 through 11) for each of YROWMIN, YROWMAX, YROW-PIX, and YROWPCT are utilized to derive YROWPOS. By knowing the column widths of each of the columns, the YROWPOS is calculated for each column within the table layout.

The YROWPOS is calculated based on available width information, YROWMIN, YROWMAX, YROWPCT, YROWPIX for each column in the table. Therefore, for each row, all of the above types of row dimension data are taken into account so depending on the priorities given to the types of row dimension data, certain values of row height will trump another value for row height in a particular row. During calculation of YROWPOS, YROWMIN has the highest priority, then YROWPCT has the secondary priority, the YROWPIX has the third highest priority, and the YROWMAX has the lowest priority. For, example, if one cell in a row has a YROWMAX value and another cell in the row has a YROWMIN value, the YROWMIN value is utilized to for table layout.

In addition, during each round of calculation, all number of possible column spans are taken into consideration. All calculations are performed on both sets of data that are calculated from left to right and from right to left as derived by the method described in FIGS. 9 through 11. At the conclusion of calculation, XCOLPOS and YROWPOS should each contain symmetric data for two sets of data (left to right and right to left).

After operation 522, the method moves to operation 524 which determines column dimensions and row dimensions. In one embodiment, the column width is determined mathematically using the equation XCOLPOS[i+1]−XCOLPOS[i]. XCOLPOS[i] is the position of a column and XCOLPOS[i+1] is the position of the next column. These values are then utilized to derive the column widths. Row height is determined by using the equation YROWPOS[i+1]−YROWPOS[i]. YROWPOS[i] is the position of a row and YROWPOS[i+1] is the position of the next row. These values are then utilized to derive the row heights. For cells that span through several columns, the cell width is determined by using the equation, XCOLPOS[i+NSPAN]−XCOLPOS[i]. XCOLPOS[i] is the position of a column and XCOLPOS[i+NSPAN] is the position of a next column with the column span. For cells that span through several rows, the cell height is determined by using the equation, YROWPOS[i+NSPAN]−YROWPOS[i]. YROWPOS[i] is the position of a column and YROWPOS[i+NSPAN] is the position of a next row with the row span.

By combining the progressive rendering, fast HTML table layout calculation and careful memory management, a fully functional HTML rendering engine is made available for systems with limit memory resources, slow network connection and low processing speed.

FIG. 8 shows a table 440 where table layout attributes are determined by a table layout algorithm in accordance with one embodiment of the present invention. The table 440 is an example of a table layout before the priorities for the different types of column dimension data and row dimension data has been applied. In this embodiment, column 1 row 4 has a value of 100, column 2 row 3 has a value of 20%, column 3 row 1 has a value of 250, and column 3 row 4 has a value of 30%. By use of left collection and right collection data as well as left accumulation and right accumulation as discussed in further detail in reference to FIGS. 9 through 11, the algorithm described herein in reference to FIGS. 4 through 6 may determine the table layout attributes by collecting and analyzing, in one embodiment, 4 sets of values for each of the columns (e.g., XCOLMIN, XCOLMAX, XCOLPIX, and XCOLPCT) and each of the rows (e.g., YROWMIN, YROWMAX, YROWPIX, and YROWPCT) instead of calculating attributes of the table layout by analyzing each individual cell.

FIGS. 9 through 11 show in tabular form the left collection and right collection arrays as well as the left accumulation values and right accumulation values. It should be appreciated that the although the values for left collection array, right collection array, left accumulation array, and right accumulation array are in tabular form, it is only done so for explanatory purposes. The methodology described herein does not require or need the use of tables. The data may be in any suitable coherent form such as, for example, in lines of values, in a spreadsheet, in a database, in blocks of numbers, as values located in any managed location, etc., as long as the values can be organized in any manner to perform the data management and calculations as described herein.

FIG. 9 shows a first table 500 with five position values for each of a left collection array and a right collection array and a second table 502 showing the values for an accumulated left to right collection array and an accumulated right to left collection array in accordance with one embodiment of the present invention. In this embodiment, the first table 500 includes an array of left collection values and an array of right collection values. The second table 502 includes an array of left accumulation values and an array of right accumulation values for column 1 row 1, column 2 row 1, column 3 row 1, and column 4 row 1 of the table 440 described in reference to FIG. 8. In one embodiment the first table 500 is a recording table used to retain the encoded data from the nodes of the HTML document tree that include the dimensions of certain cells in a table to be displayed. Once the first table 500 has been inputted with the encoded data, when processed at a later time, the first table 500 can show the values of the left and right accumulation data in the second table 502. In one embodiment, the second table 502 is a retrieving table. In such an embodiment, the data from the first table 500 may be utilized to retrieve the data into the second table 502 through use of algorithms described herein. The first table 500 and the second table 502 are used to calculate the table layout values for column widths and row heights. A set of the first table 500 and the second table 502 may exist for each of the arrays of variables (i.e., XCOLMIN, XCOLMAX, XCOLPIX, and XCOLPCT) for column widths and for each of the arrays of variables (i.e., YROWMIN, YROWMAX, YROWPCT, and YROWPIX) for row heights.

In this embodiment, the first table 500 is generated to include a left collection array and a right collection array with each array having positions for M+1 values with M equaling the number of columns in a table layout. Each of the positions starts with all zeros and is filled in with values as determined by the values of the cells as stored in nodes of the HTML document tree. The left accumulation values are encoded into the left collection array and the right accumulation values are encoded to the right collection array. This encoding of data enables the powerful storing of column widths for each specific column. Thus, by inputting certain values into the first table 500 that produce the values of the second table 502 when the two above equations are utilized, the values of the second table 502 may be intelligently recorded in the first table 500. Therefore, when the values for the second table 502 are to be retrieved, the values of the first table 500 may be processed with the left accumulation equation ($W^l[i]=x[i+1]-x[i]$) and the right accumulation equation ($W^r[i]=x[i]-x[i+1]$) to produce the values of the left accumulation row and the right accumulation row respectively of the second table 502. $W^l[i]$ is a left accumulation value for column width as a function of i. $W^r[i]$ is a right accumulation value for column width as a function of i. The variable x[i] is a variable in position i of a collection array of the first table 500 while variable x[i+1] is a variable in position i+1 in a collection array of the first table 500.

In one exemplary embodiment, if the second table 502 has four columns and two rows then the first table has two sets (for the two rows) of five numbers (or M+1 where M is the number of columns) are utilized in the first table 500. Therefore, the first table 500 has a first set of five values for a left collection array and a second set of five values for a right collection array. It should be understood that the first table 500 and the second table may have any suitable number of rows and columns depending on the display desired to be shown. The processing of the first set of five values (left collection) and the second set of five values (right collection) may generate the left accumulation values and the right accumulation values in the second table 502.

When the values for the first table 500 are derived and inputted from the values of the cells in nodes of the HTML document tree, the values for positions 0 ($P_0$) through 4 ($P_4$) of the left collection array in the first table 500 are generated as well as the values for positions 0 ($P_0$) through 4 ($P_4$) of the right collection array. Therefore, in one example, five values are inputted for each of the collection arrays of the first table when there are four columns. Thus where there are M columns and N rows, each of the collection arrays have (M+1) values when the collection arrays contain values for column widths or (N+1) values when the collection arrays contain values for row heights. The method for inputting data into the left collection arrays and right collection arrays are described in reference to FIG. 7A.

In this embodiment, the first table 500 and the second table 502 may be used to calculate the table layout values for column widths or row heights. In one embodiment, if widths for four columns (or height for four rows) are to be determined, two sets of five numbers (or M+1 where M is the number of columns) numbers are utilized in the first table 500. Therefore, the first table 500 has a first set of five values for a left collection and a second set of five values for a right collection. The processing of the first set of five values and the second set of five values may generate certain types of column width values in the second table 502.

Specifically, when the left collection values are accumulated to the second table 502, the value for position x+1 is subtracted by the value in position x in the first table 500. For example, the first left accumulation (i.e., left to right accumulation) value in cell 1 of the second table 502 is the value of position 1 minus the value of position 0 of the left collection array in the first table 500. Therefore, when the equation ($W^L[i]=x[i+1]-x[i]$) is utilized, the equation becomes 0 minus 0 resulting in the value of 0 in cell 1 of the left accumulation row in the second table 502. This calculation is done for the next four positions (i.e., position 2 minus position 1, position 3 minus position 2, and position 4 minus position 3) from left to right. This results in the left accumulation row of the second table 502 having four values for the first four columns of the table as shown in FIG. 8. Therefore, the values of cells 1, 2, 3, and 4 of the left accumulation row are 0, 0, 250, and 0 respectively.

The right accumulation (i.e., right to left accumulation) values ($W^r[i]=x[i]-x[i+1]$) in the second table 502 are calculated by taking the value of position x in the right collection array and subtracting the value of position x+1 in the right collection array located in the first table 500. Therefore, to calculate the value of cell 4 for the right accumulation row of the second table 502, the value of position 4 in the right collection array of the first table 500 is subtracted from value of position 3 in the right collection array of the first table 500. Consequently, the resulting value for cell 4 of the right accumulation row would be 0 minus 0 or 0. This is continued from right to left (e.g., position 3 minus position 2, position 2 minus position 1, and position 1 minus position 0) to obtain the values of 0, 0, 250, and 0 for cells 1, 2, 3, and 4 respectively in the right accumulation row. If there is no column span (as explained in FIG. 11), the values of the cells 1, 2, 3, and 4 for both right and left accumulation are the same. Therefore, in one embodiment, values for left accumulation and values for right accumulation are gathered for each of the XCOLMIN, XCOLMAX, XCOLPCT and XCOLPIX variables. Therefore, each of the above referenced four column width variables have two sets of data related to the table layout. In another embodiment, values for left accumulation and values for right accumulation are gathered for each of the YROWMIN, YROWMAX, YROWPIX, and YROWPCT variables. Therefore each of the above referenced four row height variables have two sets of data related to the table layout.

FIG. 10 illustrates a first table 500 and a second table 502 of FIG. 9 when a value of a dimension data of a first cell is changed in accordance with one embodiment of the present invention. Due to the desired change of the value for a type of dimension data in the first cell (column 1, row 1), the values in position 0 through position 4 in the left collection array (0, 100, 100, 350, and 350) and the right collection array (50, 250, 250, 0, and 0) of the first table 500 have been changed from the values as seen in the first table 500 in FIG. 9 to reflect the addition of the new values. Therefore, when the equations $W^l[i]=x[i+1]-x[i]$ and ($W^r[i]=x[i]-x[i+1]$) are utilized with the new value in the first cell, positions 0 through 4 of the left collection array in the first table 500 are 0, 100, 100, 350, and 350 respectively, and the values of positions 0 through 4 of the right accumulation row of the first table 500 are 350, 250, 250, 0, and 0 respectively.

FIG. 11 shows the first table 500 with a row of left collection values and a row of right collection values and a second table 502 showing the values for an accumulated left to right collection and an accumulated right to left collection depicting a column span in accordance with one embodiment of the present invention. In this embodiment, the first table 500 and the second table 502 show values and calculations which depict a column span. In one embodiment, a column span occurs when a single value in a particular row is depicted to occupy multiple columns. In this embodiment, calculations discussed in reference to FIGS. 9 and 10 are utilized. By summing the left collection value and the right collection value for each individual position (e.g., positions 0 through 4) in the recording table, whether a column exists may be determined. If the result of the summing operation for each of the positions are equal one another, then there is no column span which is the case with FIG. 9. In the tables 500 and 502 shown in FIG. 11, the sum of the value of the left collection value and the right collection value for position 3 is 0 while the value derived for position 4 is 250. Because the values are unequal, this is the encoding of the column span into the recording table.

As described above, by using the equation $W^1[i]=x[i+1]-x[i]$, values for the left accumulation values in the second table 502 may be derived from the values in the left collection array in the first table 500. In addition, by using the equation $W^r[i]=x[i]-x[i+1]$, values for the right accumulation values in the second table 502 may be derived from the values in the right collection array in the first table 500. The values of cell 3 in the left and right accumulation arrays are different, and the values of cell 4 in the left and right accumulation arrays are different. In one embodiment, because the difference between the values for a particular cell in the left and right accumulation arrays do not equal 0, this means that there is a column span.

Consequently, in one embodiment, by encoding of the column span into the left collection and right collection arrays when the values are first received from nodes in the HTML document tree, the column span data may be retrieved by calculating the left accumulation values and the right accumulation values. In this embodiment, the left collection value and the right collection value for position 3 are zero. Therefore, the sum of the two collection values for position 3 is zero. When the sum of the left collection value and the right collection value for each of the positions 0, 1, 2, and 4 are calculated, those sums all equal to 250. Thus, the value of zero derived from the calculation involving position 3 shows that a column span exists as seen in the retrieving table. Therefore, the value in the cell 4 for the left accumulation and the value for the cell 3 in the right accumulation is the value that spans both columns 3 and 4 in row 1 of the table layout.

By utilizing the intelligent encoding of table dimension attributes in a recording table, the table layout data may be accumulated into the retrieving table by the left accumulation and the right accumulation of values in the left collection array and the right collection array respectively. This enables the determination of variables such as XCOLMIN, XCOLMAX, XCOLPCT, and XCOLPIX for columns, and variables such as YROWMIN, YROWMAX, YROWPIX, and YROWPCT for rows. These variables can be utilized to calculate XCOLPOS for columns and YROWPOS for rows which establishes the table layout used for displaying a web page. By calculating column attributes and row attributes instead of calculating each cell attribute individually, the number of calculations can be reduced from M times N calculations. Column attributes and row attributes may be any suitable type of attributes need to properly display a table in an HTML based web page. In one embodiment, column attributes are column widths and row attributes are row heights. Therefore, low processing speed devices can process and display web page graphics in an optimal and user friendly manner.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for optimizing calculation of an HTML Table by a data processing device after a portion of data has been received and parsed, the portion of the data being part of complete data for at least a portion of HTML data, comprising:

before completely receiving the complete data and after receiving the portion of the data, laying out a table having dimension attributes, the dimension attributes of the table being calculated based on column attributes for at least one column and row attributes for at least one row, the column attributes and the row attributes being retrieved from the portion of data;

wherein the column attributes for the at least one column include at least one column width, and the row attributes for at least one row include at least one row height, and the column attributes and the row attributes are used to calculate table layout dimensions while bypassing cell by cell dimension calculations, thus accelerating rendering of the HTML data.

2. A method for optimizing the calculation of an HTML Table by a data processing device as recited in claim 1, wherein the at least one column width is determined by using values for XCOLMIN, XCOLMAX, XCOLPIX, and XCOLPCT for each of the at least one column width to derive a value for XCOLPOS, where XCOLMIN is an accumulative minimum width of each column, XCOLMAX is an accumulative maximum width of each column, XCOLPCT is an accumulative percentage width specification of each column, XCOLPIX is an accumulative pixel width specification of each column, XCOLPOS is an accumulative column width of each column.

3. A method for optimizing the calculation of an HTML Table by a data processing device as recited in claim 2, wherein the at least one row height is determined by using values for YROWMN, YROWMAX, YROWPIX, and YROWPCT for each of the at least one row height to derive a value for YROWPOS, where YROWMIN is an accumulative minimum height of each row, YROWMAX is an accumulative maximum height of each row, YROWPCT is an accumulative percentage height specification of each row, YROWPIX is an accumulative pixel height specification of each row, and YROWPOS is an accumulative column height of each row.

4. A method for optimizing the calculation of an HTML Table by a data processing device as recited in claim 2, wherein the value for each of XCOLMIN, XCOLMAX, XCOLPIX, and XCOLPCT for the at least one column width is each derived by usage of a left to right accumulation of values in a left collection array and by usage of a right to left accumulation of values in a right collection array.

5. A method for optimizing the calculation of an HTML Table by a data processing device as recited in claim 3, wherein the value for each of YROWMIN, YROWMAX, YROWPIX, and YROWPCT for the at least one row height is each derived by usage of a left to right accumulation of values in a left collection array and by usage of a right to left accumulation of values in a right collection array.

6. A method for optimizing the calculation of an HTML Table by a data processing device as recited in claim 2, wherein the value for XCOLPOS for each of the at least one column width is determined by prioritizing the values of XCOLMIN, XCOLMAX, XCOLPIX, and XCOLPCT for each of the at least one column width.

7. A method for optimizing the calculation of an HTML Table by a data processing device as recited in claim 3, wherein the value for YROWPOS for each of the at least one row height is determined by prioritizing the values of by using values for YROWMIN, YROWMAX, YROWPIX, and YROWPCT for each of the at least row height.

8. A method for optimizing the calculation of an HTML Table by a data processing device as recited in claim 4, wherein a column span is encoded into the left collection array and the right collection array.

9. A method for optimizing the calculation of an HTML Table by a data processing device, comprising:
   parsing a portion of data, the parsing beginning when a minimum amount of the portion of data has been received, the portion of the data being part of complete data for at least a portion of HTML data; and
   before completely receiving the complete data and after receiving the portion of the data, laying out a table having dimension attributes, the dimension attributes of the table being calculated based on column attributes for at least one column and row attributes for at least one row, the column attributes and the row attributes being retrieved from the portion of data;
   wherein the column attributes for the at least one column include at least one column width, and the row attributes for at least one row include at least one row height wherein the at least one column width is determined by using values for XCOLMIN, XCOLMAX, XCOLPIX, and XCOLPCT for each of the at least one column width to derive a value for XCOLPOS, where XCOLMIN is an accumulative minimum width of each column, XCOLMAX is an accumulative maximum width of each column, XCOLPCT is an accumulative percentage width specification of each column, XCOLPIX is an accumulative pixel width specification of each column, XCOLPOS is an accumulative column width of each column.

10. A method for optimizing the calculation of an HTML Table by a data processing device as recited in claim 9, wherein the at least one row height is determined by using values for YROWMIN, YROWMAX, YROWPIX, and YROWPCT for each of the at least one row height to derive a value for YROWPOS, where YROWMIN is an accumulative minimum height of each row, YROWMAX is an accumulative maximum height of each row, YROWPCT is an accumulative percentage height specification of each row, YROWPIX is an accumulative pixel height specification of each row, and YROWPOS is an accumulative column height of each row.

11. A method for optimizing the calculation of an HTML Table by a data processing device as recited in claim 9, wherein the value for each of XCOLMIN, XCOLMAX, XCOLPIX, and XCOLPCT for the at least one column width is each derived by usage of a left to right accumulation of values in a left collection array and by usage of a right to left accumulation of values in a right collection array.

12. A method for optimizing the calculation of an HTML Table by a data processing device as recited in claim 10, wherein the value for each of YROWMIN, YROWMAX, YROWPIX, and YROWPCT for the at least one row height is each derived by usage of a left to right accumulation of values in a left collection array and by usage of a right to left accumulation of values in a right collection array.

13. A method for optimizing the calculation of an HTML Table by a data processing device as recited in claim 9, wherein the value for XCOLPOS for each of the at least one column width is determined by prioritizing the values of XCOLMIN, XCOLMAX, XCOLPIX, and XCOLPCT for each of the at least one column width.

14. A method for optimizing the calculation of an HTML Table by a data processing device as recited in claim 10, wherein the value for YROWPOS for each of the at least one row height is determined by prioritizing the values of by using values for YROWMIN, YROWMAX, YROWPIX, and YROWPCT for each of the at least row height.

15. A method for optimizing the calculation of an HTML Table by a data processing device as recited in claim 11, wherein a column span is encoded into the left collection array and the right collection array.

16. A method for optimizing the calculation of an HTML Table by a data processing device recited in claim 9, wherein the minimum amount of the portion of data is at least 1 kilobyte.

17. A method for optimizing calculation of an HTML Table by a data processing device, comprising:
   laying out a table having dimension attributes, the dimension attributes of the table being calculated based on column attributes and row attributes, the column attributes being determined by using at least one of an accumulative percentage width specification and an accumulative pixel width specification; and
   wherein the column attributes for at least one column include at least one column width, and the row attributes for at least one row include at least one row height, the at least one column width is determined by using values for XCOLMIN, XCOLMAX, XCOLPIX, and XCOLPCT for each of the at least one column width to derive a value for XCOLPOS, where XCOLMIN is an accumulative minimum width, XCOLMAX is an accumulative maximum width, XCOLPIX is the accumulative pixel width specification, XCOLPCT is the accumulative percentage width specification, and XCOLPOS is an accumulative column width.

18. A method for optimizing the calculation of an HTML Table by a data processing device as recited in claim 17, wherein the at least one row height is determined by using values for YROWMIN, YROWMAX, YROWPIX, and YROWPCT for each of the at least one row height to derive a value for YROWPOS, where YROWMIN is an accumulative minimum height, YROWMAX is an accumulative maximum height, YROWPCT is an accumulative percentage height specification, YROWPIX is an accumulative pixel height specification, and YROWPOS is an accumulative column height.

19. A method for optimizing the calculation of an HTML Table by a data processing device as recited in claim 17, wherein the value for each of XCOLMIN, XCOLMAX, XCOLPIX, and XCOLPCT for the at least one column width is each derived by usage of a left to right accumulation of values in a left collection array and by usage of a right to left accumulation of values in a right collection array.

20. A method for optimizing the calculation of an HTML Table by a data processing device as recited in claim 18, wherein the value for each of YROWMIN, YROWMAX, YROWPIX, and YROWPCT for the at least one row height is each derived by usage of a left to right accumulation of values in a left collection array and by usage of a right to left accumulation of values in a right collection array.

21. A method for optimizing the calculation of an HTML Table by a data processing device as recited in claim 17, wherein the value for XCOLPOS for each of the at least one column width is determined by prioritizing the values of XCOLMIN, XCOLMAX, XCOLPIX, and XCOLPCT for each of the at least one column width.

22. A method for optimizing the calculation of an HTML Table by a data processing device as recited in claim 18, wherein the value for YROWPOS for each of the at least one row height is determined by prioritizing the values of by using values for YROWMIN, YROWMAX, YROWPIX, and YROWPCT.

23. A method for optimizing calculation of an HTML Table by a data processing device, comprising:
  laying out a table having dimension attributes, the dimension attributes of the table being calculated based on column attributes and row attributes, the row attributes being determined by using at least one of an accumulative percentage height specification and an accumulative pixel height specification;
  wherein the column attributes for at least one column include at least one column width, and the row attributes for at least one row include at least one row height and the at least one row height is determined by using values for YROWMIN, YROWMAX, YROWPIX, and YROWPCT for each of the at least one row height to derive a value for YROWPOS, where YROWMIN is an accumulative minimum height, YROWMAX is an accumulative maximum height, YROWPCT is the accumulative percentage height specification, YROWPIX is the accumulative pixel height specification, and YROWPOS is an accumulative column height.

24. A method for optimizing the calculation of an HTML Table by a data processing device as recited in claim 23, wherein the at least one column width is determined by using values for XCOLMIN, XCOLMAX, XCOLPIX, and XCOLPCT for each of the at least one column width to derive a value for XCOLPOS, where XCOLMIN is an accumulative minimum width, XCOLMAX is an accumulative maximum width, XCOLPIX is an accumulative pixel width specification, XCOLPCT is an accumulative percentage width specification, and XCOLPOS is an accumulative column width.

25. A method for optimizing the calculation of an HTML Table by a data processing device as recited in claim 24, wherein the value for each of XCOLMIN, XCOLMAX, XCOLPIX, and XCOLPCT for the at least one column width is each derived by usage of a left to right accumulation of values in a left collection array and by usage of a right to left accumulation of values in a right collection array.

26. A method for optimizing the calculation of an HTML Table by a data processing device as recited in claim 23, wherein the value for each of YROWMIN, YROWMAX, YROWPIX, and YROWPCT for the at least one row height is each derived by usage of a left to right accumulation of values in a left collection array and by usage of a right to left accumulation of values in a right collection array.

27. A method for optimizing the calculation of an HTML Table by a data processing device as recited in claim 24, wherein the value for XCOLPOS for each of the at least one column width is determined by prioritizing the values of XCOLMIN, XCOLMAX, XCOLPIX, and XCOLPCT for each of the at least one column width.

28. A method for optimizing the calculation of an HTML Table by a data processing device as recited in claim 23, wherein the value for YROWPOS for each of the at least one row height is determined by prioritizing the values of by using values for YROWMIN, YROWMAX, YROWPIX, and YROWPCT for each of the at least row height.

* * * * *